United States Patent
Raman et al.

(10) Patent No.: US 12,244,482 B1
(45) Date of Patent: Mar. 4, 2025

(54) SYSTEMS AND METHODS FOR A NETWORKING DEVICE TO SEND HEARTBEAT PACKETS ON MULTIPLE PATHS TO A SECOND NETWORKING DEVICE

(71) Applicant: Pensando Systems Inc., Milpitas, CA (US)

(72) Inventors: Balakrishnan Raman, Fremont, CA (US); Krishna Doddapaneni, Cupertino, CA (US); Pirabhu Raman, Fremont, CA (US); Sarat Kamisetty, Fremont, CA (US); Hareesh Ramachandran, Bangalore (IN)

(73) Assignee: Pensando Systems Inc., Milpitas, CA (US)

( * ) Notice: Subject to any disclaimer, the term of this patent is extended or adjusted under 35 U.S.C. 154(b) by 0 days.

(21) Appl. No.: 18/238,723

(22) Filed: Aug. 28, 2023

(51) Int. Cl.
*H04L 43/10* (2022.01)
*H04L 47/2483* (2022.01)

(52) U.S. Cl.
CPC .......... *H04L 43/10* (2013.01); *H04L 47/2483* (2013.01)

(58) Field of Classification Search
CPC .......................... H04L 43/10; H04L 47/2483
See application file for complete search history.

(56) References Cited

U.S. PATENT DOCUMENTS

| | | | | |
|---|---|---|---|---|
| 8,116,213 | B2* | 2/2012 | Krygowski | H04L 43/50 370/248 |
| 2018/0062875 | A1* | 3/2018 | Tumuluru | H04L 47/825 |
| 2018/0063743 | A1* | 3/2018 | Tumuluru | G06F 9/5077 |
| 2020/0007629 | A1* | 1/2020 | Tse | H04L 43/10 |
| 2021/0399998 | A1* | 12/2021 | Bas | H04L 49/901 |
| 2022/0124182 | A1* | 4/2022 | Galles | H04L 69/22 |
| 2022/0221844 | A1* | 7/2022 | Amaro, Jr. | H04L 41/344 |
| 2023/0021342 | A1 | 1/2023 | Wang et al. | |
| 2023/0066338 | A1 | 3/2023 | Cui et al. | |
| 2023/0267160 | A1 | 8/2023 | Shribman et al. | |

FOREIGN PATENT DOCUMENTS

| | | | | |
|---|---|---|---|---|
| CN | 102984029 | B | * 7/2015 | |
| CN | 106254267 | A | * 12/2016 | H04L 47/2408 |
| CN | 114698146 | A | * 7/2022 | |

OTHER PUBLICATIONS

Seggelmann, R. n et al. "Transport Layer Security (TLS) and Datagram Transport Layer Security (DTLS) Heartbeat Extension", Internet Engineering Task Force (IETF); Request for Comments: 6520, Feb. 2012, 9 pgs.

* cited by examiner

*Primary Examiner* — Oanh Duong
(74) *Attorney, Agent, or Firm* — LOZA & LOZA, LLP

(57) ABSTRACT

A networking device can include a packet processing pipeline circuit and a processor. The packet processing pipeline circuit can be configured to implement a data plane and the processor can be configured to implement a control plane. The packet processing pipeline circuit and the processor can also be configured to send a plurality of heartbeat packets on multiple paths to a second networking device. The data plane can produce and send the heartbeat packets to the second networking device within a heartbeat period. The data plane may send a second plurality of heartbeat packets on multiple paths to the second networking device with a second heartbeat period. The heartbeat packets can have unique packet five tuples that include an IP address of the second networking device.

20 Claims, 14 Drawing Sheets

SYSTEMS AND METHODS FOR A NETWORKING DEVICE TO SEND HEARTBEAT PACKETS ON MULTIPLE PATHS TO A SECOND NETWORKING DEVICE

TECHNICAL FIELD

The systems and methods relate to computer networks, local area networks, and networking devices. A router, a switch, a network interface card (NIC), a smartNIC, and a distributed service card (DSC), are examples of networking devices. The systems and methods also relate to elements of networking devices such as semiconductor chips that include packet processing pipeline circuits that implement data planes of networking devices.

BACKGROUND

Networking devices process network flows by receiving network packets and processing the network packets. The network packets are often processed by examining the packet's header data and applying networking policies such as routing policies, firewall policies, load balancing policies, etc. Packet processing can be performed by a packet processing pipeline such as a "P4" packet processing pipeline. The concept of a domain-specific language for programming protocol-independent packet processors, known simply as "P4," developed to provide some flexibility at the data plane of a networking device. The P4 domain-specific language for programming the data plane of networking devices has been defined in the "$P4_{16}$ Language Specification," version 1.2.2, as published by the P4 Language Consortium on May 17, 2021. P4 (also referred to herein as the "P4 specification," the "P4 language," and the "P4 program") is designed to be implementable on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, control flow, extern objects, user-defined metadata, and intrinsic metadata. Packet processing pipeline circuits can be considered to be central processing unit (CPU) offloads because they offload work from the CPUs and thereby free the CPUs to perform other tasks. Cryptographic transform circuits, compression circuits, and decompression circuits, are also examples of CPU offloads.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a networking device. The networking device can include a packet processing pipeline circuit configured to implement a data plane, and a processor configured to implement a control plane, wherein the packet processing pipeline circuit and the processor are further configured to send a plurality of heartbeat packets on multiple paths to a second networking device, the data plane produces and sends the heartbeat packets to the second networking device within a heartbeat period and the heartbeat packets have a plurality of unique packet five tuples that include an internet protocol (IP) address of the second networking device.

Another aspect of the subject matter described in this disclosure can be implemented by a method. The method can include producing, by a networking device, a plurality of heartbeat packets; and sending the heartbeat packets to a second networking device within a heartbeat period, wherein the heartbeat packets have a plurality of unique packet five tuples having a destination address that is an internet protocol (IP) address of the second networking device.

Yet another aspect of the subject matter described in this disclosure can be implemented in a system. The system can include a production means for producing a plurality of heartbeat packets that have a plurality of unique packet five tuples having a destination address that is an internet protocol (IP) address of a second networking device, and a sending means for sending the heartbeat packets to the second networking device within a heartbeat period.

In some implementations of the methods and devices, the devices may further include a heartbeat timer that triggers sending the heartbeat packets within the heartbeat period. In some implementations of the methods and devices, the data plane is configured to place the heartbeat packets on an input queue of the packet processing pipeline circuit in response to a heartbeat trigger signal produced by a heartbeat timer. In some implementations of the methods and devices, the unique packet five tuples include a plurality of unique source port values. In some implementations of the methods and devices, the heartbeat packets are sent from at least two egress ports of the networking device. In some implementations of the methods and devices, each of the unique packet five tuples has a source port value that is different from the source port value of every other one of the unique packet five tuples, and every source port value is randomly generated for each of the unique packet five tuples. In some implementations of the methods and devices, the packet processing pipeline circuit is configured to produce the heartbeat packets. In some implementations of the methods and devices, the control plane is configured to queue the heartbeat packets on an input queue of the data plane.

In some implementations of the methods and devices, the packet processing pipeline circuit and the processor are further configured to produce a second plurality of heartbeat packets and send the heartbeat packets to the second networking device within a second heartbeat period, the second plurality of heartbeat packets having a second plurality of unique packet five tuples. In some implementations of the methods and devices, one of the second plurality of unique packet five tuples and one of the plurality of unique packet five tuples are identical. In some implementations of the methods and devices, the networking device sends the heartbeat packets from a plurality of egress ports, and the data plane is configured to implement a load balancer that uses the unique packet five tuples to select the egress ports for the heartbeat packets. In some implementations of the methods and devices, the networking device is configured to send the heartbeat packets to a load balancer that sends the heartbeat packets from a plurality of egress ports, and the load balancer is configured to use the unique packet five tuples to select the egress ports for the heartbeat packets.

In some implementations of the methods and devices, the networking device includes a packet processing pipeline circuit configured to implement a data plane, and the networking device includes a processor configured to implement a control plane that configures the data plane to send the heartbeat packets to the second networking device. In some implementations of the methods and devices, the data plane is configured to queue the heartbeat packets on an input queue of the data plane. In some implementations of the methods and devices, a heartbeat timer triggers sending the heartbeat packets within the heartbeat period and triggers sending a second plurality of heartbeat packets to the second networking device within a second heartbeat period. In some implementations of the methods and devices, the unique packet five tuples include a plurality of unique source port values. In some implementations of the methods and devices, the heartbeat packets are sent from at least two egress ports of the networking device.

In some implementations of the methods and devices, the device further includes a timer means for causing the heartbeat packets to be sent within the heartbeat period and for causing a second plurality of heartbeat packets to be sent to the second networking device within a second heartbeat period.

These and other aspects will become more fully understood upon a review of the detailed description, which follows. Other aspects and features will become apparent to those of ordinary skill in the art, upon reviewing the following description of specific examples in conjunction with the accompanying figures. While features may be discussed relative to certain examples and figures below, any example may include one or more of the advantageous features discussed herein. In other words, while one or more examples may be discussed as having certain advantageous features, one or more of such features may also be used in accordance with the various examples discussed herein. In similar fashion, while the examples may be discussed below as devices, systems, or methods, the examples may be implemented in various devices, systems, and methods.

BRIEF DESCRIPTION OF THE DRAWINGS

Throughout the description, similar reference numbers may be used to identify similar elements.

DETAILED DESCRIPTION

Figure 1:
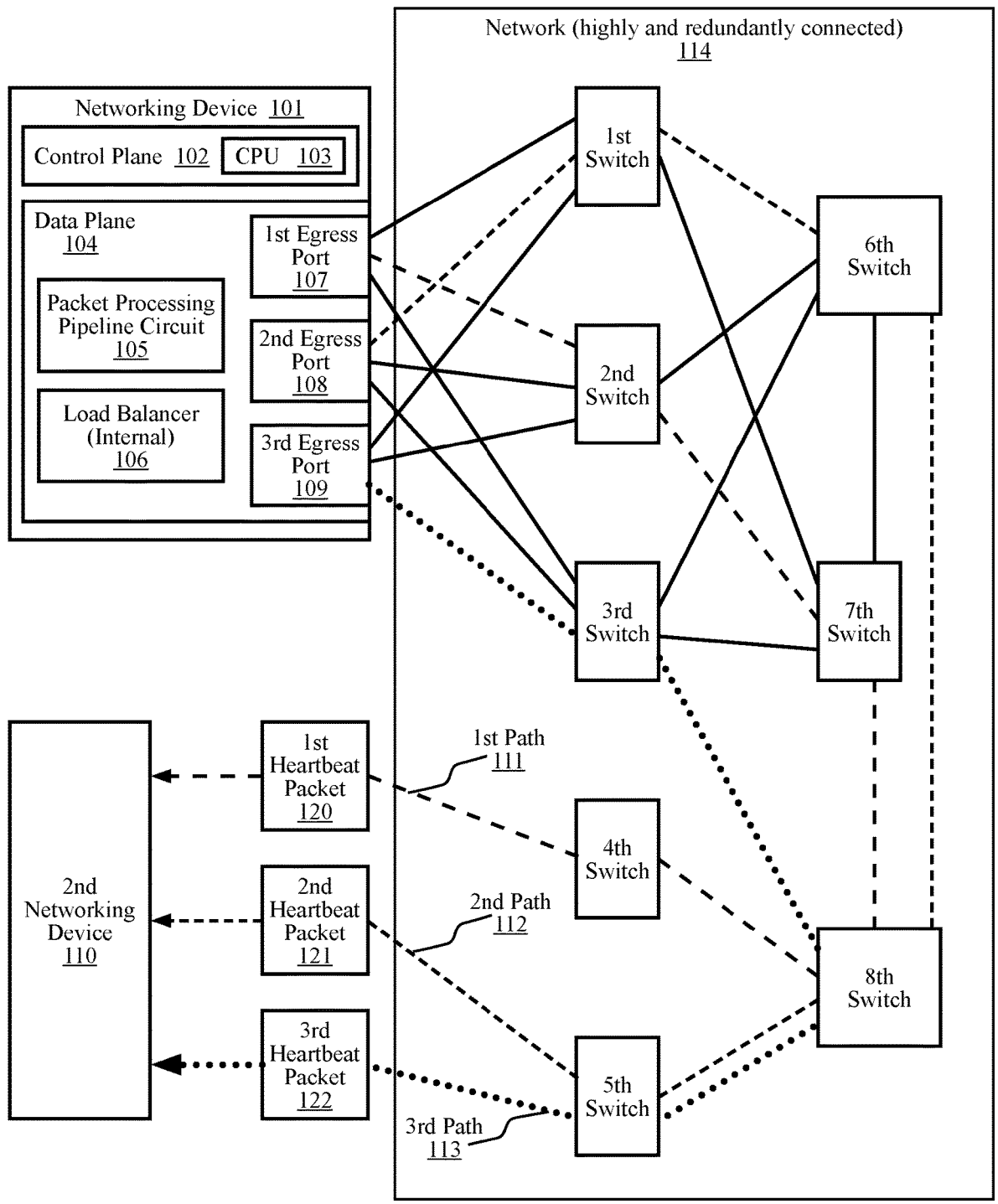
FIG. 1 is a high-level conceptual diagram illustrating a networking device sending heartbeat packets on multiple paths to a second networking device, according to some aspects.

It will be readily understood that the components of the examples as generally described herein and illustrated in the appended figures could be arranged and designed in a wide variety of different configurations. Thus, the following more detailed description of various examples, as represented in the figures, is not intended to limit the scope of the present disclosure, but is merely representative of various examples. While the various aspects of the examples are presented in drawings, the drawings are not necessarily drawn to scale unless specifically indicated.

Systems and methods that implement aspects may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method implements each and every aspect that may be realized. Rather, language referring to the features and advantages is understood to mean that a specific feature, advantage, or characteristic described in an example may be implemented in or by at least one example. Thus, discussions of the features and advantages, and similar language, throughout this specification may, but do not necessarily, refer to the same example.

Furthermore, the described features, advantages, characteristics, and aspects may be combined in any suitable manner in one or more systems or methods. One skilled in the relevant art will recognize, in light of the description herein, that one example may be practiced without one or more of the specific features or advantages of another example. In other instances, additional features and advantages may be recognized in one example that may not be present in all the examples.

Reference throughout this specification to "one example", "an example", or similar language means that a particular feature, structure, or characteristic described in connection with the indicated example is included in at least one example. Thus, the phrases "in one example", "in an example", and similar language throughout this specification may, but do not necessarily, all refer to the same example.

In the field of data networking, the functionality of networking devices such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network flows extremely quickly if the match-action pipeline is configured to process those network flows. A match-action pipeline has a series of match-action stages. Upon receiving a packet of a network flow, the first match-action stage of a match-action pipeline can generate an index from data in the packet header. Finding a flow table entry for the network flow at the index location in the flow table is the "match" portion of "match-action". If there is a "match", the "action" is performed to thereby process the packet. If there is no flow table entry for the network flow, it is a new network flow that the match-action pipeline is not yet configured to process. If there is no match, then the match-action stage can perform a default action. Match-action stages may pass the packet to a subsequent match-action stage in the match-action pipeline.

The high-volume and rapid decision-making that occurs at the data plane is often implemented in one or more semiconductor chips. An application specific integrated circuit (ASIC) and a field programmable gate array (FPGA) are examples of such semiconductor chips. A semiconductor chip such as a fixed function ASIC may enable high-volume and rapid packet processing. However, a fixed function ASIC typically does not provide enough flexibility to adapt to changing needs. Data plane processing implemented in FPGAs may provide a high level of flexibility in data plane processing.

Data centers can have thousands or tens of thousands of devices (e.g., servers and networking devices such as switches, routers, NICs, etc.). To improve reliability and resilience, the data centers often have numerous redundant paths between the devices. The devices can be in deployments, such as high availability (HA) deployments, that require one device to detect when another device is not operational (e.g., shut down or crashed) or unreachable. Receiving a heartbeat packet from a source device that produces and sends heartbeat packets can prove that the source device is operational and reachable. The time between sending heartbeat packets is the heartbeat period. For example, the source device can send a heartbeat packet to a destination device (e.g., the device to which the heartbeat packets are addressed) once per second when the heartbeat period is one second. A problem that can occur is that the heartbeat packets traverse a specific route and the heartbeat packets may be lost when that specific route goes down (e.g., unplugged cable, crashed switch, etc.). As such, the heartbeat packets on one route may be lost while there are other available routes between the source device and the destination device. In response to not receiving any heartbeat packets, the destination device may consider the source device to be not operational even though the source device is operational and reachable for traffic other than the heartbeat packets.

A technique for dealing with lost heartbeat packets involves sending heartbeat packets that have unique five tuples within a single heartbeat period. The heartbeat packets can therefore traverse different routes from the source device to the destination device. Networking devices along a path, particularly load balancers, often produce a pseudorandom value by hashing some of the packet's header fields that are in the packet's five tuple and then use that pseudorandom value to select a route or egress port for the packet. For example, one of four egress ports can be selected by using the lower 2 bits of the pseudorandom value as the egress port number or an index into a list of egress ports. Heartbeat packets can therefore be sent along multiple paths when one or more of the header fields are different in different heartbeat packets. Furthermore, multiple heartbeat packets can be sent every heartbeat period such that the destination device is more likely to receive one of the heartbeat packets every heartbeat period.

One advantage of sending multiple heartbeat packets on multiple paths is that a problem traversing one particular path of the multiple paths does not cause all the heartbeat packets to be lost. Another advantage is that the source device is known to be operational and reachable when only one of many heartbeat packets is received. Yet another advantage is that having multiple redundant paths between devices provides reliability to heartbeat processes (e.g., processes sending or receiving of heartbeat packets).

FIG. 1 is a high-level conceptual diagram illustrating a networking device 101 sending heartbeat packets on multiple paths to a second networking device, according to some aspects. The networking device has a control plane 102 with a CPU 103 and a data plane 104 with a packet processing pipeline circuit 105, a first egress port 107, a second egress port 108, and a third egress port 109. The data plane can have an internal load balancer 106. For example, the packet processing pipeline circuit 105 may use a load balancing algorithm to select an egress port for each network packet. The load balancing algorithm may use a hash value to select the egress port. Three heartbeat packets are shown taking three different paths through a network 114. The highly and redundantly connected network 114 provides multiple paths from the networking device 101 to the second networking device 110. The first heartbeat packet 120 takes the first path 111 by being sent from the first egress port 107 to the 2nd switch, then to the 7th switch, then to the 8th switch, then to the 4th switch, and finally to the second networking device 110. The second heartbeat packet 121 takes the second path 112 by being sent from the second egress port 108 to the 1st switch, then to the 6th switch, then to the 8th switch, then to the 5th switch, and finally to the second networking device 110. The third heartbeat packet 122 takes the third path 113 by being sent from the third egress port 109 to the 3rd switch, then to the 8th switch, then to the 5th switch, and finally to the second networking device 110.

Figure 2:
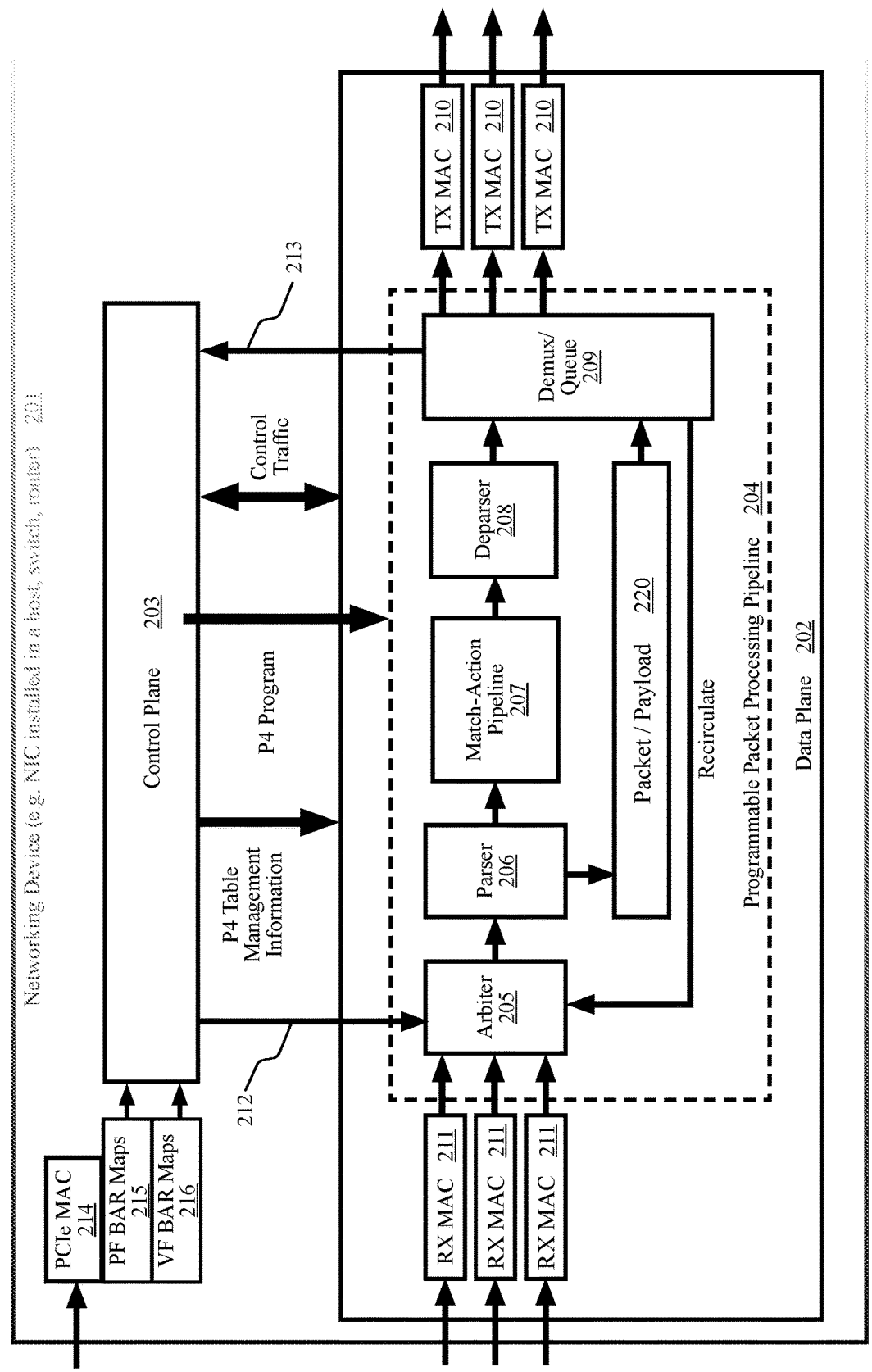
FIG. 2 is a functional block diagram of a networking device having a control plane and a data plane and in which aspects may be implemented.

FIG. 2 is a functional block diagram of a networking device having a control plane and a data plane and in which aspects may be implemented. A networking device 201 can have a control plane 203 and a data plane 202. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of networking devices that are used in data networks. For example, the concept of a domain-specific language for programming protocol-independent packet processors, known simply as "P4," was developed to provide some flexibility at the data plane of a networking device. The document "$P4_{16}$ Language Specification," version 1.2.2, published by the P4 Language Consortium on May 17, 2021, which is incorporated by reference herein, describes the P4 domain-specific language that can be used for programming the data plane of networking devices. P4 (also referred to herein as the "P4 specification," the "P4 language," and the "P4 program") is designed to be implementable on a large variety of targets including switches, routers, programmable NICs, software switches, semiconductor chip, FPGAs, and ASICs. As described in the P4 specification, the primary abstractions provided by the P4 language relate to header types, parsers, tables, actions, match-action units, match-action pipeline stages, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a layer 2 protocol such as Ethernet. The layer 2 protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs can be configured to implement operations related to, for example, transmitting frames, half-duplex retransmission, and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane can use a dedicated channel or bus, can use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane. The data plane corresponds to a class of algorithms that describe transformations on packets by packet processing systems.

The data plane 202 includes a programmable packet processing pipeline 204 that is programmable using a domain-specific language such as P4. As described in the P4 specification, a programmable packet processing pipeline can include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 can act as an ingress unit receiving packets from RX MACs 211 and can also receive packets from the control plane via a control plane packet input 212. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 203 via an output central processing unit (CPU) port 213. The arbiter 205 and the demux/queue 209 can be configured through the domain-specific language (e.g., P4).

The parser 206 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the networking device. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniBand protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A networking device 201 can have a peripheral component interconnect extended (PCIe) interface such as PCIe media access control (MAC) 214. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and a virtual function (VF). A PCIe SR-IOV capable device may have multiple VFs. A PF BAR map 215 can be used by the host machine to communicate with the PCIe card. A VF BAR map 216 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC' VFs and "InfiniBand" VFs to VMs running on the host. The InfiniBand PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 3:
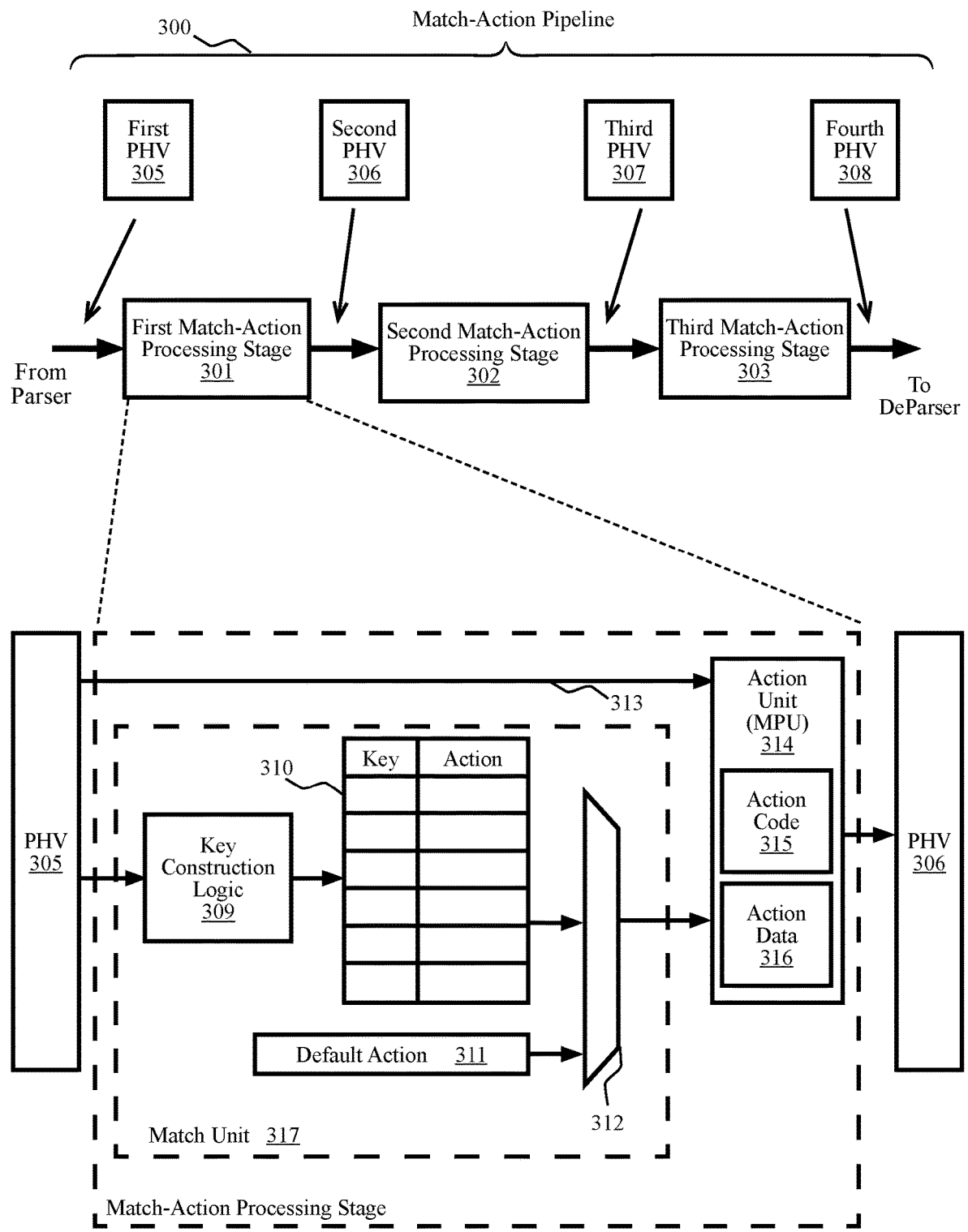
FIG. 3 is a functional block diagram illustrating an example of a match-action processing stage in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often called stages or match-action processing stages, of the packet processing pipeline. The match-action processing stages 301, 302, 303 of the match-action pipeline 300 are programmed to perform "match-action" operations in which a match unit performs a lookup using at least a portion of the PHV and an action unit performs an action based on an output from the match unit.

A PHV generated at the parser may be passed through each of the match-action processing stages in the match-action pipeline in series and each match-action processing stages can implement a match-action operation or policy. The PHV and/or table entries may be updated in each stage of match-action processing according to the actions specified by the P4 programming. In some instances, a packet may be recirculated through the match-action pipeline, or a portion thereof, for additional processing. The first match-action processing stage 301 receives the first PHV 305 as an input and outputs the second PHV 306. The second match-action processing stage 302 receives the second PHV 306 as an input and outputs the third PHV 307. The third match-action processing stage 303 receives the third PHV 307 as an input and outputs the fourth PHV 308. The match-action processing stages are arranged as a match-action pipeline because the PHVs pass from one match-action processing stage to the next match-action processing stage in the pipeline.

An expanded view of elements of a match-action processing stage 301 of match-action pipeline 300 is shown. The match-action processing stage includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, access control lists (ACLs), and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action processing stages can be programmable by the control plane via P4 and the contents of the lookup table (e.g., a flow table) can be managed by the control plane.

Figure 4:
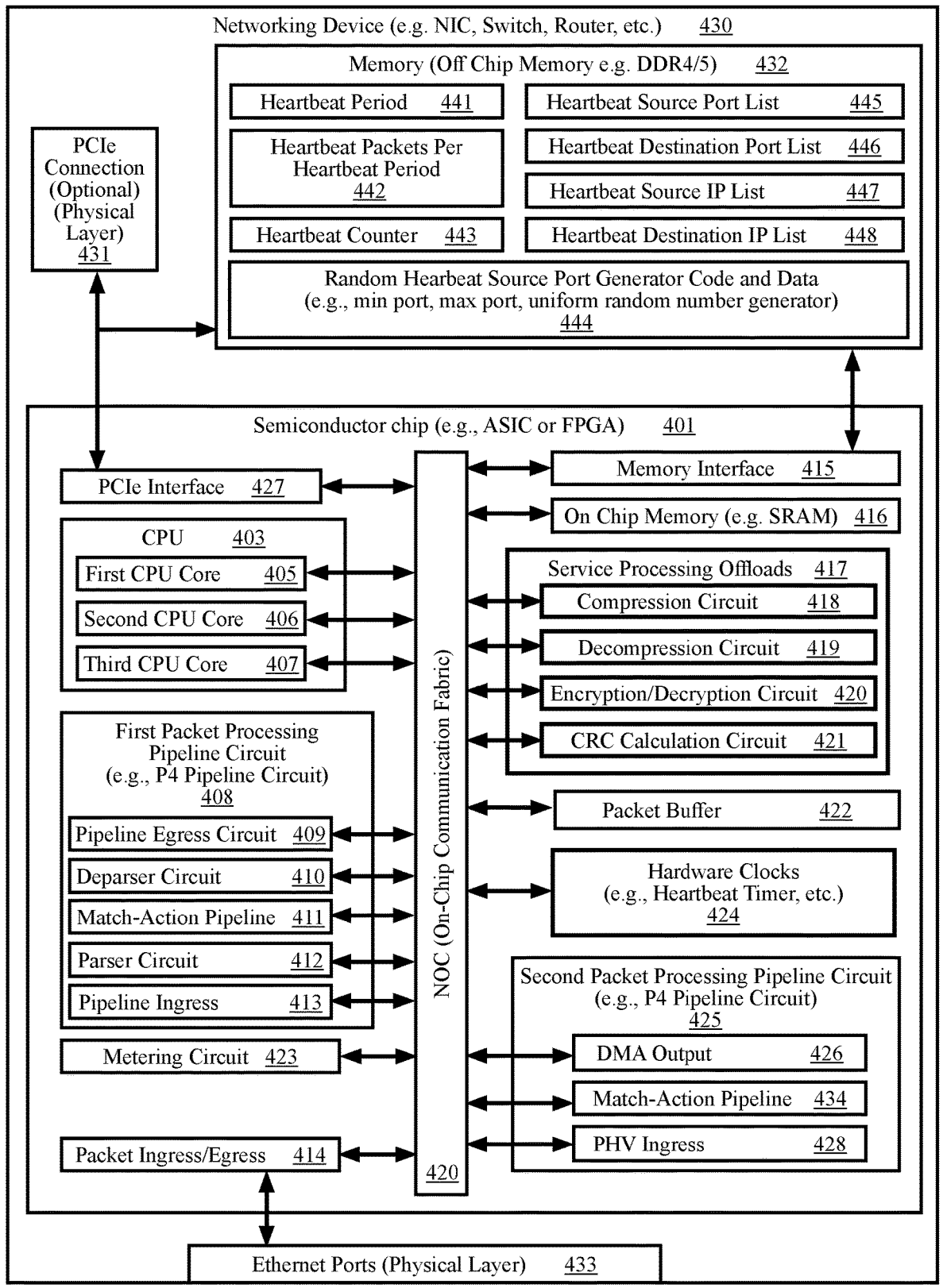
FIG. 4 is a functional block diagram of a networking device having a semiconductor chip such as an application specific integrated circuit (ASIC) or field programmable gate array (FPGA), according to some aspects.

FIG. 4 is a functional block diagram of a networking device 430 having a semiconductor chip 401 such as an ASIC or FPGA, according to some aspects. The semiconductor chip 401 shows a single semiconductor chip implementing many hardware functions. A different and substantially equivalent implementation may employ a chiplet architecture. If the networking device is a network interface card (NIC) then the NIC can be installed in a host computer and can act as a networking device for the host computer and for virtual machines running on the host computer. Such a NIC can have a PCIe connection 431 for communicating with the host computer via a host PCIe connection. The networking device 430 can have a semiconductor chip 401, off-chip memory 432, and ethernet ports 433. The off-chip memory 432 can be one of the widely available memory modules or chips such as double data rate 5 (DDR5)

synchronous dynamic random-access memory (SDRAM) such that the semiconductor chip 401 has access to many gigabytes of memory on the networking device 430. The ethernet ports 433 provide physical connectivity to a computer network such as the internet. The NIC can include a printed circuit board to which the semiconductor chip 401 and the memory 432 are attached.

The semiconductor chip 401 can have many core circuits interconnected by an on-chip communications fabric, sometimes called a network on a chip (NOC) 402. NOCs are often implementations of standardized communications fabrics such as the widely used advanced extensible interface (AXI) bus. The semiconductor chip's core circuits can include a PCIe interface 427, CPU 403, first packet processing pipeline circuit 408, memory interface circuit 415, on-chip memory 416 that may be a static random access memory (SRAM), service processing offloads 417, a packet buffer 422, metering circuit 423, and packet ingress/egress circuits 414. The PCIe interface 427 can be used to communicate with a host computer via the PCIe connection 431. The CPU 403 can include numerous CPU cores such as a first CPU core 405, a second CPU core 406, and a third CPU core 407. The first packet processing pipeline circuit 408 can include a pipeline ingress circuit 413, a parser circuit 412, match-action pipeline 411, a deparser circuit 410, and a pipeline egress circuit 409. The second packet processing pipeline circuit 425 can include a PHV ingress circuit 428, a match-action pipeline 434, and a direct memory access (DMA) output circuit 426. The service processing offloads 417 are circuits implementing functions that the semiconductor chip uses so often that the designer has chosen to provide hardware for offloading those functions from the CPUs. The service processing offloads can include a compression circuit 418, decompression circuit 419, an encryption/decryption circuit 420, and a general use CRC calculation circuit 421. The compression circuit 418 may compress blocks of data in the off-chip memory 432 or the on-chip memory 416. The decompression circuit 419 may decompress blocks of data in the off-chip memory 432 or the on-chip memory 416. The encryption/decryption circuit 420 may encrypt and decrypt blocks of data in the off-chip memory 432 or the on-chip memory 416. The general use CRC calculation circuit 421 can calculate digest values of blocks of data in the off-chip memory 432 or the on-chip memory 416. For example, the general use CRC calculation circuit 421 can calculate Ethernet FCS values. The specific core circuits implemented within the non-limiting example of the semiconductor chip 401 can be selected such that the semiconductor chip implements many, perhaps all, of the functionality of an InfiniBand channel adapter, of an NVMe card, and of a networking device that processes network flows carried by internet protocol (IP) packets.

A network device can include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. Clock period). Time values obtained from the clocks can be used as timestamps for events such as enqueuing/dequeuing a packet. The hardware clock 424 may implement a heartbeat timer that triggers or otherwise causes a plurality of heartbeat packets to be sent every heartbeat period. The hardware clock may also produce a timestamp that may be included in the heartbeat packets.

The first packet processing pipeline circuit 408 is a specialized set of elements for processing PHVs including PHVs for network packets such as internet protocol (IP) packets and InfiniBand protocol data units (PDUs). The first packet processing pipeline circuit 408 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The second packet processing pipeline circuit 425 is a specialized set of elements for processing PHVs including PHVs for network packets such as internet protocol (IP) packets and InfiniBand protocol data units (PDUs). The second packet processing pipeline circuit 425 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The networking device 430 can include a memory 432 for running Linux or some other operating system and for storing data used by the processes implementing network services, upgrading the control plane, and upgrading the data plane. The networking device can use the memory 432 to store a heartbeat period 441, a heartbeat packets per heartbeat period 442, a heartbeat counter 443, a heartbeat source port list 445, a heartbeat destination port list 446, a heartbeat source IP list 447, a heartbeat destination IP list 448, and random heartbeat source port generator code and data 444. The networking device 430 can send a plurality of heartbeat packets every heartbeat period. Heartbeat period 441 can be a value that indicates the heartbeat period (e.g., 1 second, 50 milliseconds, etc.). Heartbeat packets per heartbeat period 442 can be a value that indicates the number of heartbeat packets that are in the plurality of heartbeat packets that is sent every heartbeat period. Heartbeat counter 443 can be a value that is incremented by one every heartbeat period to thereby count the number of heartbeat periods since the heartbeat counter was last reset (e.g., set to zero).

As discussed above, network devices may use the values in some of the header fields of a network packet to select a route or egress port for the network packet. Those header fields may be the source port field, the destination port field, the source IP address field, and the destination IP address field. The source port value in the source port field may be the most convenient value to vary because the source port value usually is not allocated to a specific application. As such, the source port value in each heartbeat packet may be selected from a heartbeat source port list 445 that includes unique source port values. For example, if five heartbeat packets are sent every heartbeat period, then the heartbeat source port list can include five values, none the same as any other, that are used as the heartbeat packet source port values every heartbeat period. When the destination device can receive heartbeat packets on multiple destination ports, then the heartbeat destination port list 446 can be a list of those destination ports. When the networking device 430 (the source device) has multiple IP addresses from which it can send heartbeat packets to the destination device, then the heartbeat source IP list 447 can be a list of those IP addresses. When the destination device (e.g., second networking device 110) has multiple IP addresses on which it can receive heartbeat packets from the first networking device 430, then the heartbeat destination IP list 448 can be a list of those IP addresses. The header fields of the heartbeat packets may be varied by selecting different values from the lists of allowed values for each of those fields. The lists of allowed values may be the heartbeat source port list 445, the heartbeat destination port list 446, the heartbeat source IP list 447, and the heartbeat destination IP list 448.

Instead of using the heartbeat source port list 445, every source port value can be randomly generated for each of the heartbeat packets by the random heartbeat source port generator code and data 444. For example, uniform random number generators are commonly used to generate pseudo-random numbers within a range. A minimum port value and a maximum port value can specify the range of source port values generated by a uniform random number generator (URNG). If one of the source port values is the same as another one of the source port values then the duplicate source port value can be replaced with a newly generated random source port value such that all the source port values are unique source port values.

The CPU cores 405, 406, 407 can be general purpose processor cores, such as ARM processor cores, microprocessor without interlocked pipelined stages (MIPS) processor cores, and/or x86 processor cores, as is known in the field. Each CPU core can include an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 405, 406, 407 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by a packet processing pipeline circuits 408, 425.

The first packet processing pipeline circuit 408 can be a specialized circuit or part of a specialized circuit using one or more semiconductor chips such as ASICs or FPGAs to implement programmable packet processing pipelines such as the programmable packet processing pipeline 204 of FIG. 2. Some networking devices include semiconductor chips such as ASICs or FPGAs implementing a P4 pipeline as a fast data path within the networking device. The fast data path is called the fast data path because it processes packets faster than a slow data path that can also be implemented within the networking device. An example of a slow data path is a software implemented data path wherein the CPU 403 and memory 432 are configured via software to implement a slow data path. A networking device having two data paths has a fast data path and a slow data path when one of the data paths processes packets faster than the other data path.

All data transactions in the semiconductor chip 401, including on-chip memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. Several vendors provide NOC IP cores. The NOC may provide cache coherent interconnect between the NOC masters, including the first packet processing pipeline circuit 408, the second packet processing pipeline circuit 425, CPU 403, memory interface circuit 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
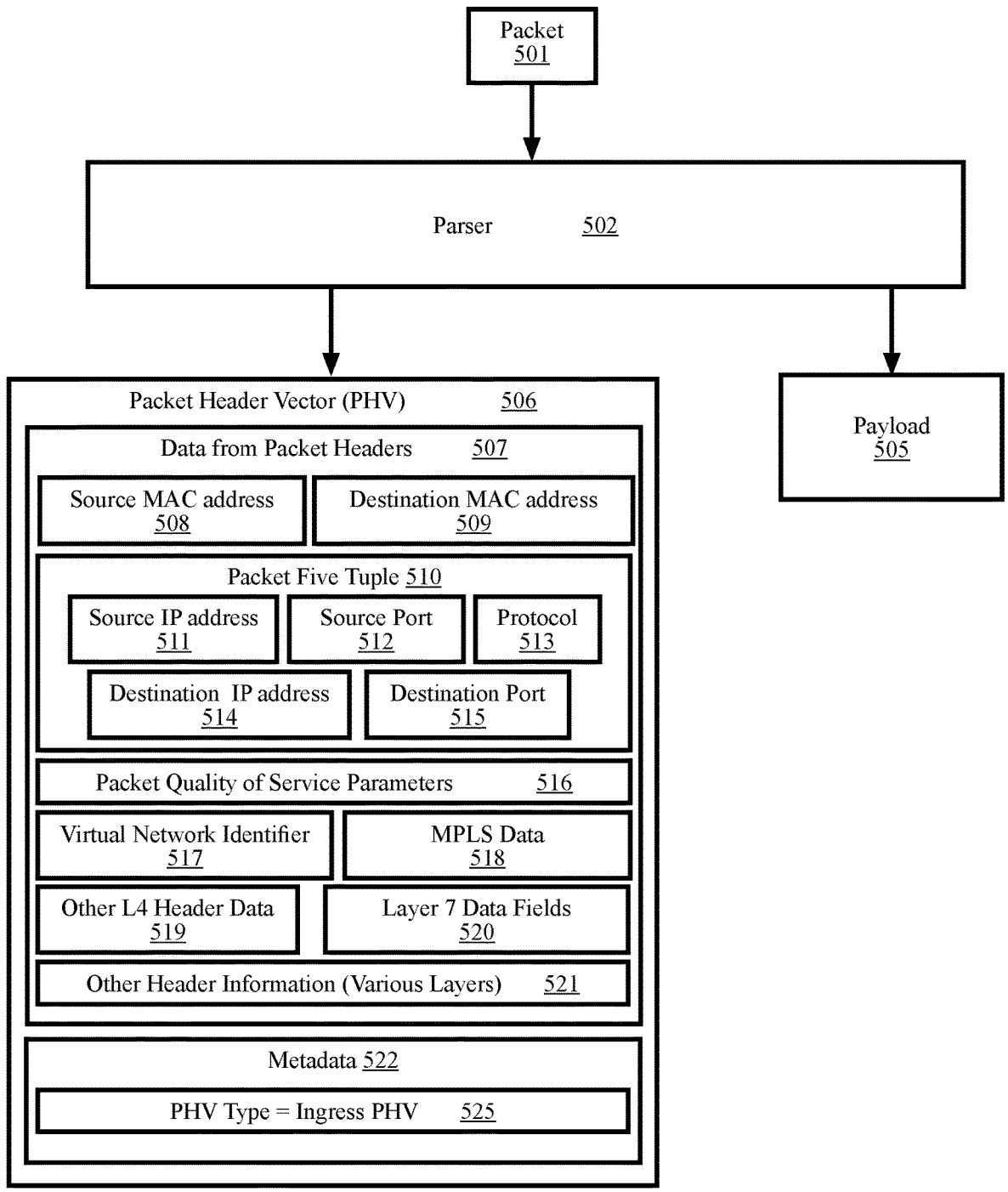
FIG. 5 is a high-level diagram illustrating an example of generating a packet header vector from a packet according to some aspects.

FIG. 5 is a high-level diagram illustrating an example of generating an ingress packet header vector 506 from a packet 501 according to some aspects. The PHV 506 is an ingress PHV because it is produced by a parser 502 parsing a packet 501 received via an ingress port as a bit stream. The parser 502 can receive a packet 501 that has layer 2, layer 3, layer 4, and layer 7 headers and payloads. The parser can generate a packet header vector (PHV) from packet 501. The packet header vector 506 can include many data fields including data from packet headers 507 and metadata 522. The metadata 522 can include data generated by the networking device such as the hardware port on which the packet 501 was received and the packet timestamps indicating when the packet 501 was received by the networking device, enqueued, dequeued, etc. The metadata 522 can also include data produced by the networking device while processing a packet or assembling a packet. Such metadata 522 can include a PHV type 525 (e.g., Ingress PHV).

The source MAC address 508 and the destination MAC address 509 can be obtained from the packet's layer 2 header. The source IP address 511 can be obtained from the packet's layer 3 header. The source port 512 can be obtained from the packet's layer 4 header. The protocol 513 can be obtained from the packet's layer 3 header. The destination IP address 514 can be obtained from the packet's layer 3 header. The destination port 515 can be obtained from the packet's layer 4 header. The packet quality of service parameters 516 can be obtained from the packet's layer 3 header or another header based on implementation specific details. The layer 4 header data 517 may be obtained from the packet's layer 4 header. The multi-protocol label switching (MPLS) data 518, such as an MPLS label, may be obtained from the packet's layer 2 header. The layer 7 header data 519 can be obtained from the packet's layer 7 header. The other layer 7 data fields 520 can be obtained from the packet's layer 7 payload. The other header information 521 is the other information contained in the packet's layer 2, layer 3, layer 4, and layer 7 headers.

The packet five tuple 510 is often used for generating keys for looking up and reading entries in key-value tables such as flow tables. The packet five tuple 510 can include the source IP address 511, the source port 512, the protocol 513, the destination IP address 514, and the destination port 515. Certain networking devices (e.g., load balancers, load balancing switches, etc.) may use the packet five tuple to select a route or egress port for a network packet. In many cases, the protocol 513 is the same for most of the packets and a packet four tuple may instead be used to select a route or egress port for a network packet. The packet four tuple can include the source IP address 511, the source port 512, the destination IP address 514, and the destination port 515.

Those practiced in computer networking protocols realize that the headers carry much more information than that described here, realize that substantially all of the headers are standardized by documents detailing header contents and fields, and know how to obtain those documents. The parser can also be configured to output a payload 505. Recalling that the parser 502 is a programmable element that is configured through the domain-specific language (e.g., P4) to extract information from a packet, the specific contents of the payload 505 are those contents specified via the domain specific language. For example, the contents of the payload 505 can be the layer 4 payload, the layer 7 payload, etc.

Figure 6:
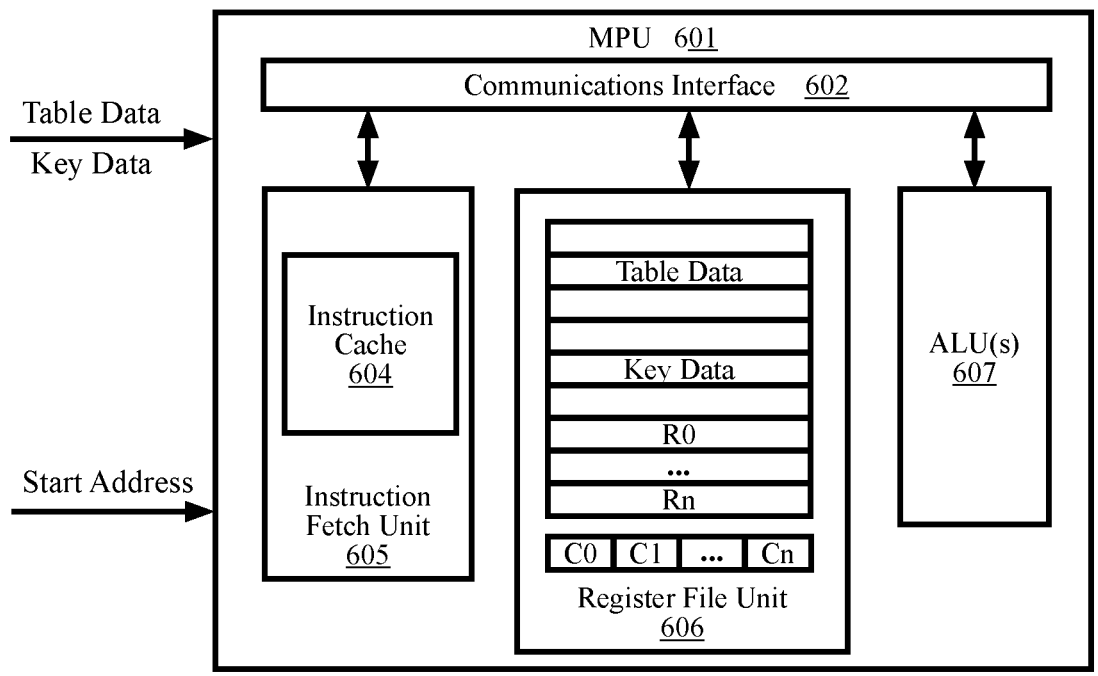
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the on-chip communications fabric system according to the examples in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the table lookup result or at least a portion of the table lookup result. The instruction fetch unit may support branches and/or linear code paths based on table results or a portion of a table result provided by a table engine. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs.

The one or more programs can be any programs such as P4 programs related to reading table data, building headers, DMA to/from memory, writing to/from memory, and various other actions. The one or more programs can be executed in any match-action processing stage.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some MPUs, each register of the register file is 64 bits and may be initially loaded with special metadata values such as hash value from table lookup, packet size, PHV timestamp, programmable table constant and the like.

The register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. The MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, and the like. For example, an ALU may be configured to support P4 compliant meters. A meter is a type of action executable on a table match used to measure data flow rates. A meter may include several bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

A single MPU may be configured to execute instructions of a program until completion of the program. Multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
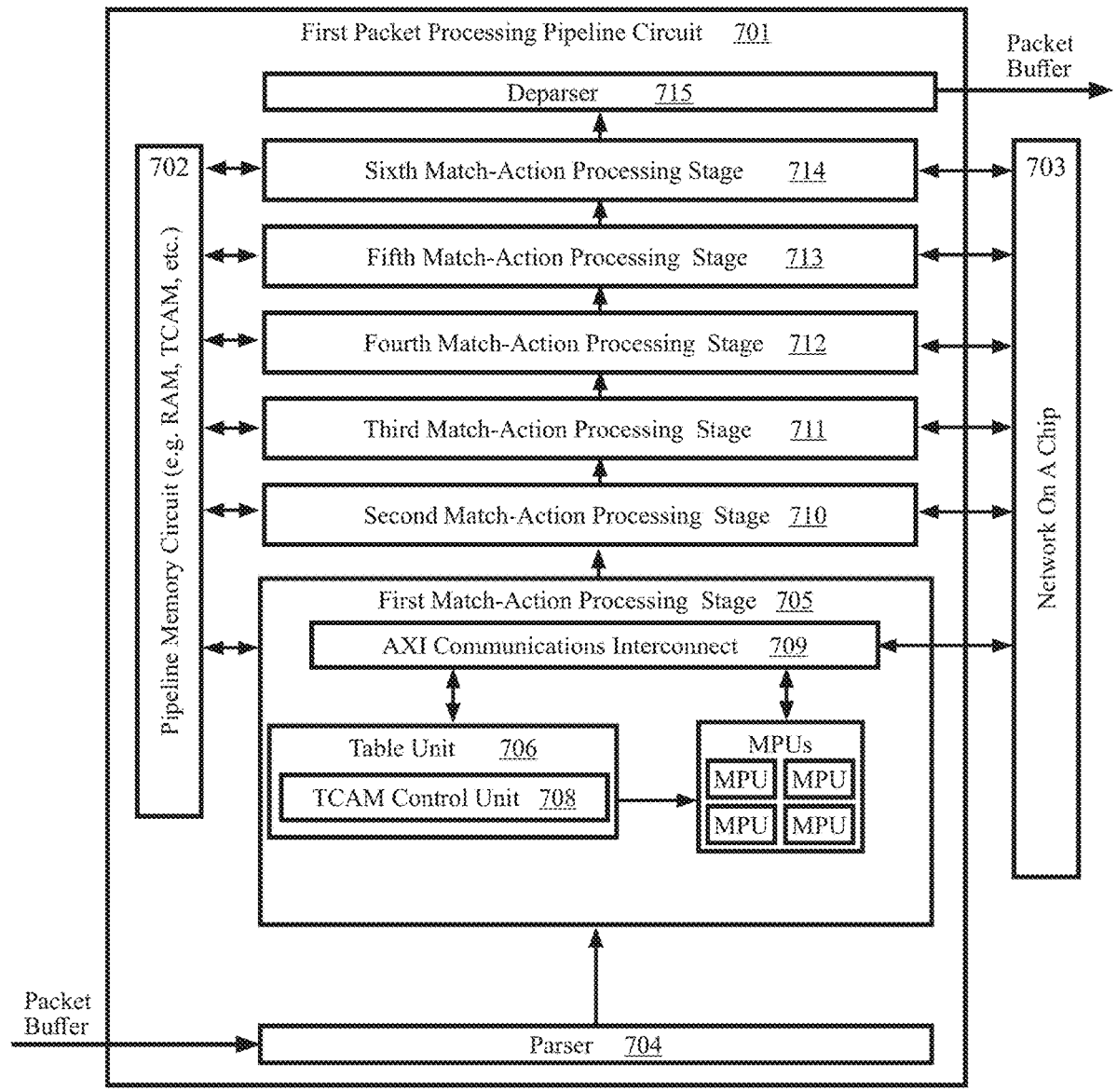
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. The packet processing pipeline circuit 701 can be a P4 pipeline circuit in a semiconductor chip. The packet processing pipeline circuit 701 can be programmed to provide various features, including, but not limited to, routing, bridging, tunneling, forwarding, network ACLs, layer 4 firewalls, flow based rate limiting, VLAN tag policies, membership, isolation, multicast and group control, label push/pop operations, layer 4 load balancing, layer 4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 704) according to the packet header stack specified by a P4 program. This parsed representation of the packet may be referred to as a packet header vector (PHV). The PHV may then be passed through match-action processing stages (e.g., match-action processing stages 705, 710, 711, 712, 713, 714) of the match-action pipeline. Each match-action processing stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The networking device 430 of FIG. 4 can have a P4 pipeline that is implemented via a packet processing pipeline circuit 701.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the match-action processing stages 705, 710, 711, 712, 713, 714 can be the same as the MPU 601 of FIG. 6. Match-action processing stages can have any number of MPUs. The match-action processing stages of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (iPv4), Internet Protocol version 6 (iPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table engine 706 can have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 706 may be implemented by hardware or circuitry. The table engine may be hardware defined. In some cases, the results of table lookups or table results are provided to the MPU in its register file.

A match-action pipeline can have multiple match-action processing stages such as the six units illustrated in the example of FIG. 7. In practice, a match-action pipeline can have any number of match-action processing stages. The match-action processing stages can share a pipeline memory circuit 702 that can be static random-access memory (SRAM), TCAM, some other type of memory, or a combination of different types of memory. The packet processing pipeline circuit stores data in the pipeline memory circuit. For example, the packet processing pipeline circuit can store a table in the pipeline memory circuit that configures the packet processing pipeline circuit to process specific network flows. For example, a flow table or multiple flow tables may be stored in the pipeline memory circuit 702 and can store instructions and data that the packet processing pipeline circuit uses to process a packet. The pipeline memory circuit is more than half full when it is storing data used by the packet processing pipeline circuit and less than half the capacity of the pipeline memory circuit is free.

The second match-action pipeline circuit 425 includes a match-action pipeline 434. That match-action pipeline 434 can include match-action processing stages such as match-action processing stages 705, 710, 711, 712, 713, 714.

Figure 8:
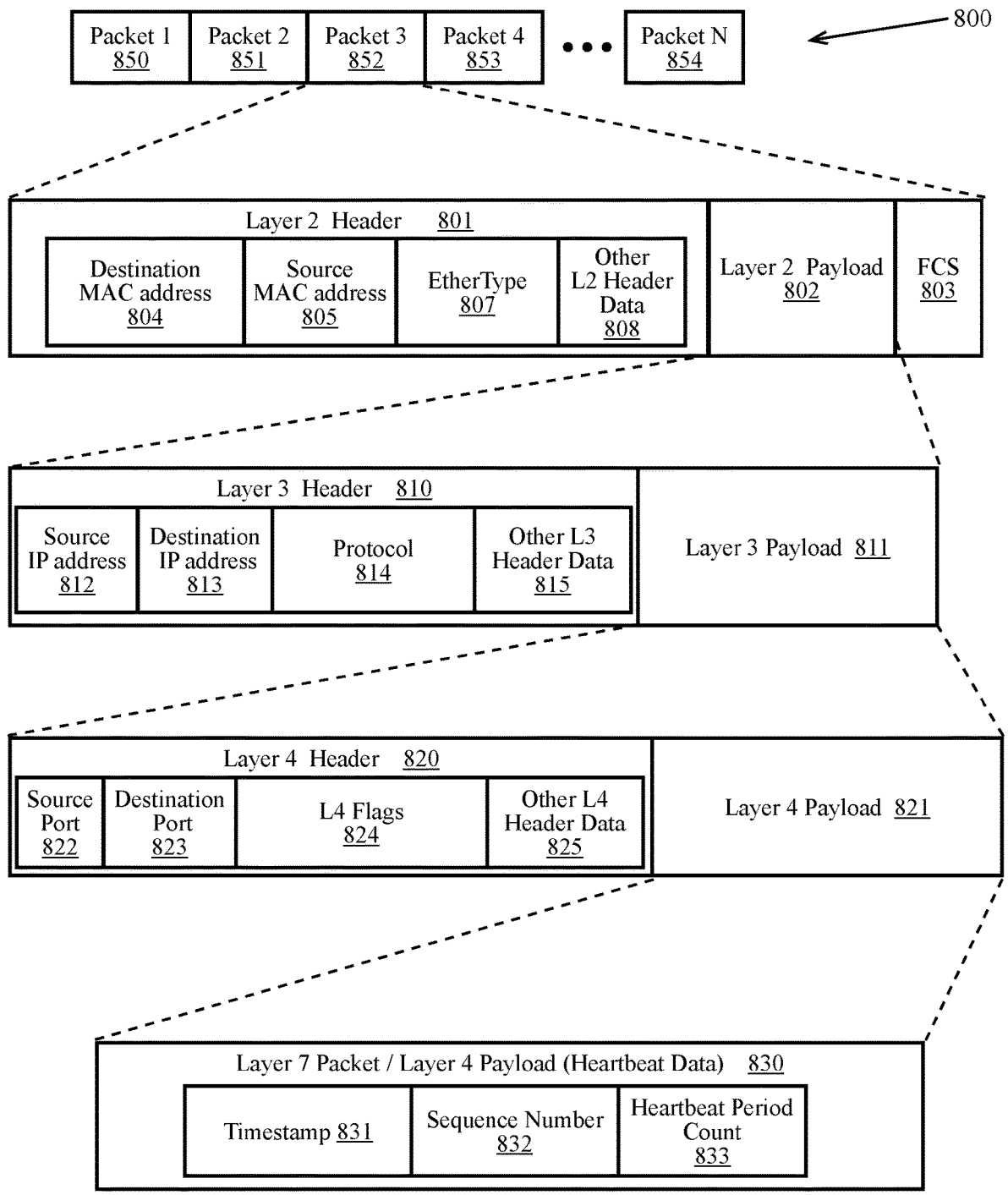
FIG. 8 illustrates packet headers and payloads of packets for network traffic flows including heartbeat packets, according to some aspects.

FIG. 8 illustrates packet headers and payloads of packets for network traffic flows including heartbeat packets, according to some aspects. A group of network packets passing from one specific endpoint to another specific endpoint is a network flow. A network flow 800 can have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 211 as a raw bit stream or transmitted by TX MAC 210 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet (an Ethernet packet is shown) has a layer 2 header 801, a layer 2 payload 802, and a layer 2 frame check sequence (FCS) 803. The layer 2 header can contain a source MAC address 804, a destination MAC address 805, an optional 802.1Q header 806, optional VLAN tag information 807, and other layer 2 header data 808. The input ports 211 and output ports 210 of a networking device 201 can have MAC addresses. A networking device 201 can have a MAC address that is applied to all or some of the ports. Alternatively, a networking device may have one or more ports that each have their own MAC address. In general, each port can send and receive packets. As such, a port of a networking device can be configured with a RX MAC 211 and a TX MAC 210. Ethernet, also known as Institute of Electrical and Electronics Engineers (IEEE) 802.3, is a layer 2 protocol. IEEE 802.11 (WiFi) is another widely used layer 2 protocol. The layer 2 payload 802 can include a layer 3 packet. The layer 2 FCS 803 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 806 and VLAN tag information 807 are specified by the IEEE 802.1Q standard. The 802.1Q header is the two-octet value 0x8100 that indicates that VLAN tag information 807 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be networking devices such as networking device 201. Internet protocol (IP) is a commonly used layer 3 protocol that is specified in requests for comment (RFCs) published by the Internet Engineering Task Force (IETF). More specifically, the format and fields of IP packets are specified by IETF RFC 791. The layer 3 packet (an IP packet is shown) can have a layer 3 header 810 and a layer 3 payload 811. The layer 3 header of an IP packet is an IP header and the layer 3 payload of an IP packet is an IP payload. The layer 3 header 810 can have a source IP address 812, a destination IP address 813, a protocol indicator 814, and other layer 3 header data 815. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 804 indicating the first node, a destination MAC address 805 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 804 indicating the intermediate node, a destination MAC address 805 indicating the second node, and the IP packet as a payload. The layer 3 payload 811 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 810 using protocol indicator 814. Transmission control protocol (TCP, specified by IETF RFC 793), user datagram protocol (UDP, specified by IETF RFC 768), and internet control message protocol (ICMP, specified by IETF RFC 792) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 811 includes a TCP header and a TCP payload. UDP can provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a connectionless model.

A layer 4 packet (a TCP packet is shown) can have a layer 4 header 820 (a TCP header is shown) and a layer 4 payload 821 (a TCP payload is shown). The layer 4 header 820 can include a source port 822, destination port 823, layer 4 flags 824, and other layer 4 header data 825. The source port and the destination port can be integer values used by host computers to deliver packets to application programs configured to listen to and send on those ports. The layer 4 flags 824 can indicate a status of or action for a network flow. A layer 4 payload 821 can contain a layer 7 packet.

The application layer, often called layer 7, includes the protocols used by most applications for providing user services or exchanging application data over the network connections established by the lower level protocols. Examples of application layer protocols include NVMe/TCP, RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 821 may include a layer 4 payload 821 that includes heartbeat data 830. The layer 4 payload 821 is illustrated as including heartbeat data 830. As such, FIG. 8 illustrates an example of a network packet that is a heartbeat packet. A heartbeat packet can be sent from a networking device to a second networking device. The heartbeat data in the heartbeat packet may include a timestamp 831, a sequence number 832, and a heartbeat period count 833. The timestamp 831 can indicate the time at which the heartbeat packet was sent. The destination device may use the timestamp to determine whether or not the heartbeat packet is current. The heartbeat packet can be current when the current time minus the timestamp is less than a threshold value. A heartbeat packet that is current indicates that the networking device is currently operational and in contact with the second networking device. A heartbeat packet that is not current does not indicate that the networking device is currently operational. The heartbeat packet may be one of many heartbeat packets that are sent within a heartbeat period and each of those heartbeat packets may have a sequence number 832. For example, five heartbeat packets sent within a heartbeat period can have sequence numbers 1 through 5. If only four of the five heartbeat packets are received, then the sequence number of the missing packet can be used to identify a path that is down or dropping packets. The heartbeat period count 833 can indicate how heartbeat periods there have been since the heartbeat counter 443 has been reset (e.g., set to zero). The heartbeat period count can be used to detect when a heartbeat packet was sent during a previous heartbeat period and is therefore no longer current. For example, the second networking device may have received heartbeat packets that have heartbeat period count=N and is now expecting heartbeat packets that have heartbeat period count=N+1. A heartbeat packet for which the heartbeat period count equals N, or a smaller number, is no longer current and does not indicate that the networking device is currently operational.

Figure 9:
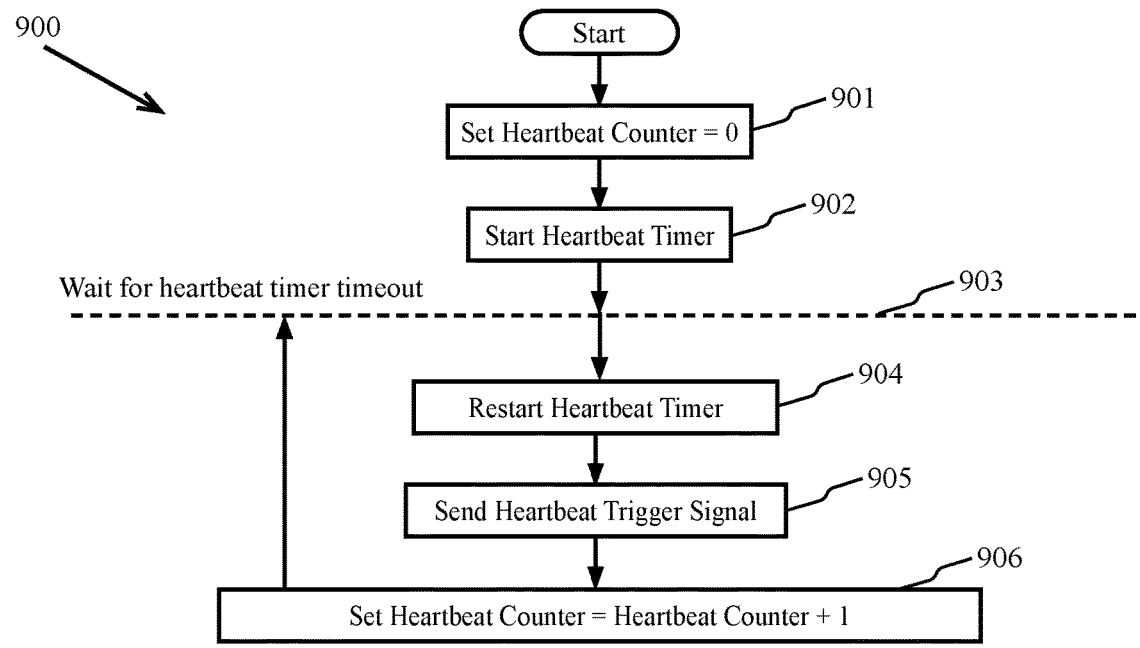
FIG. 9 is a high-level flow diagram illustrating a process that produces a heartbeat trigger signal every heartbeat period, according to some aspects.

FIG. 9 is a high-level flow diagram illustrating a process that produces a heartbeat trigger signal every heartbeat period 900, according to some aspects. After the start, the heartbeat counter is set to zero at block 901. At block 902, the heartbeat timer is started. At delay 903, the process waits for the heartbeat timer to timeout. The heartbeat timer can timeout after the heartbeat period has elapsed. For example, when the heartbeat period is 1 second, then the heartbeat timer times out 1 second after the heartbeat timer is started at block 902 or restarted at block 904. After the delay 903, the heartbeat timer is restarted at block 904. At block 905, a heartbeat trigger signal is sent. The heartbeat trigger signal can trigger the networking device to send a plurality of heartbeat packets. At block 906, the heartbeat counter is incremented by one before the process returns to delay 903.

Figure 10:
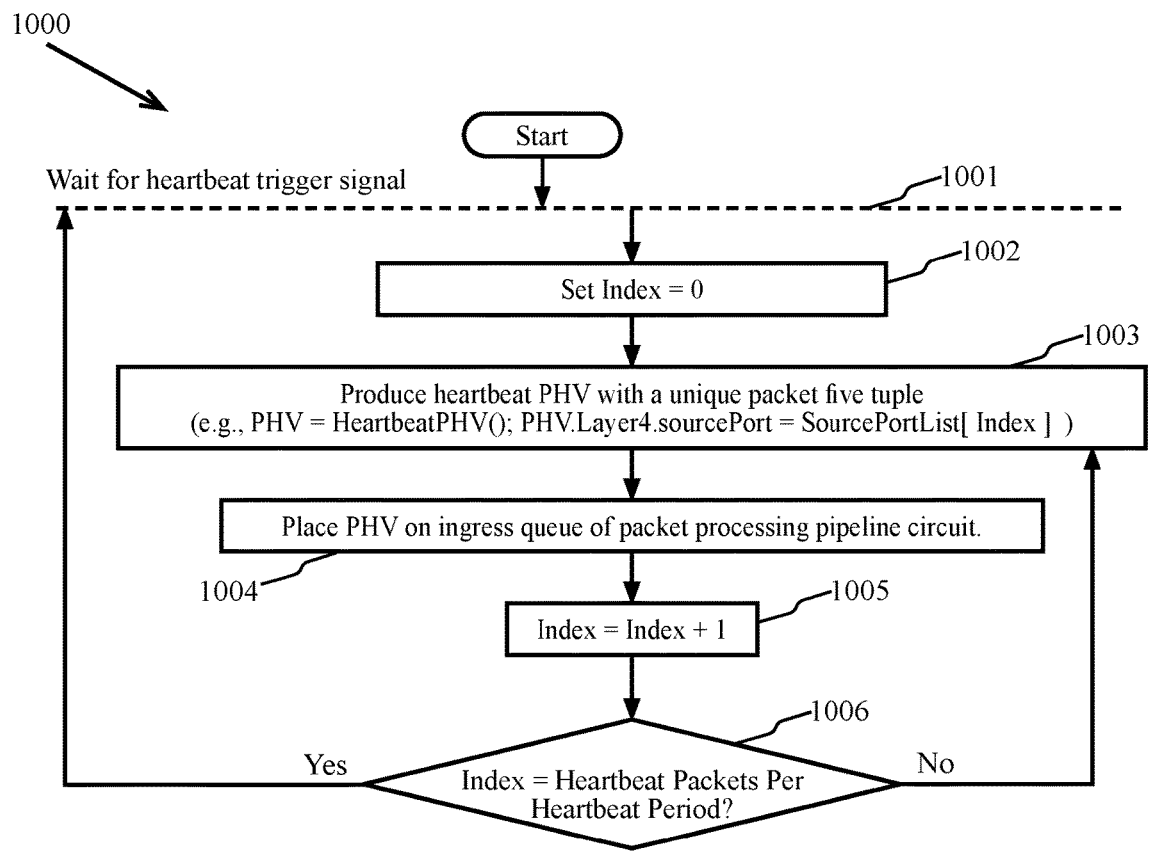
FIG. 10 is a high-level flow diagram illustrating a process that places heartbeat packets on an input queue of the packet processing pipeline circuit in response to a heartbeat trigger signal, according to some aspects.

FIG. 10 is a high-level flow diagram illustrating a process responding to a heartbeat trigger signal by queueing production of the heartbeat packets by the data plane 1000, according to some aspects. The control plane or the data plane may implement a process such as that illustrated in FIG. 10. The control plane may configure the data plane to respond to the heartbeat trigger signal by producing and sending the heartbeat packets. For example, the heartbeat trigger signal may be a heartbeat trigger PHV that is placed on an ingress queue of the packet processing pipeline circuit. The packet processing pipeline circuit may be configured to respond to a heartbeat trigger PHV or some other type of heartbeat trigger signal by placing heartbeat PHVs on an ingress queue as shown in FIG. 10. After the start, the process waits at delay 1001 for a heartbeat trigger signal such as that sent at block 905 of FIG. 9. After the delay 1001, index is set to zero at block 1002. Unique source port values can be obtained by using "Index" as an index into the heartbeat source port list 445. Source port values are unique source port values when each one of the source port values is different from every other source port value in the source port list. At block 1003, a heartbeat PHV with a unique packet five tuple is produced. For example, a constructor (e.g., HeartbeatPHV( )) can produce a generic heartbeat PHV and the four tuple can be filled in with values in the heartbeat source port list 445, the heartbeat destination port list 446, the heartbeat source IP list 447, and the heartbeat destination IP list 448. The protocol may be a default value produced by the constructor (e.g., the protocol value for UDP). Setting the packet five tuple to a unique source port value results in a unique packet five tuple. "Index" can be used to read a unique source port value from the heartbeat source port list. At block 1004 the heartbeat PHV is placed on an ingress queue of the packet processing pipeline circuit. The packet processing pipeline circuit can use the heartbeat PHV to produce a heartbeat packet. The unique packet five tuple in the heartbeat PHV results in the packet processing pipeline producing a heartbeat packet that has a unique packet five tuple. At block 1005, Index is incremented by one. At decision block 1006, the process can determine whether all the heartbeat packets that are to be sent in the current heartbeat period have been sent by checking if Index=Heartbeat Packets Per Heartbeat Period 442. If Index=Heartbeat Packets Per Heartbeat Period 442 at decision block 1006, the process loops back to delay 1001. Otherwise, the process loops back to block 1003.

Figure 11:
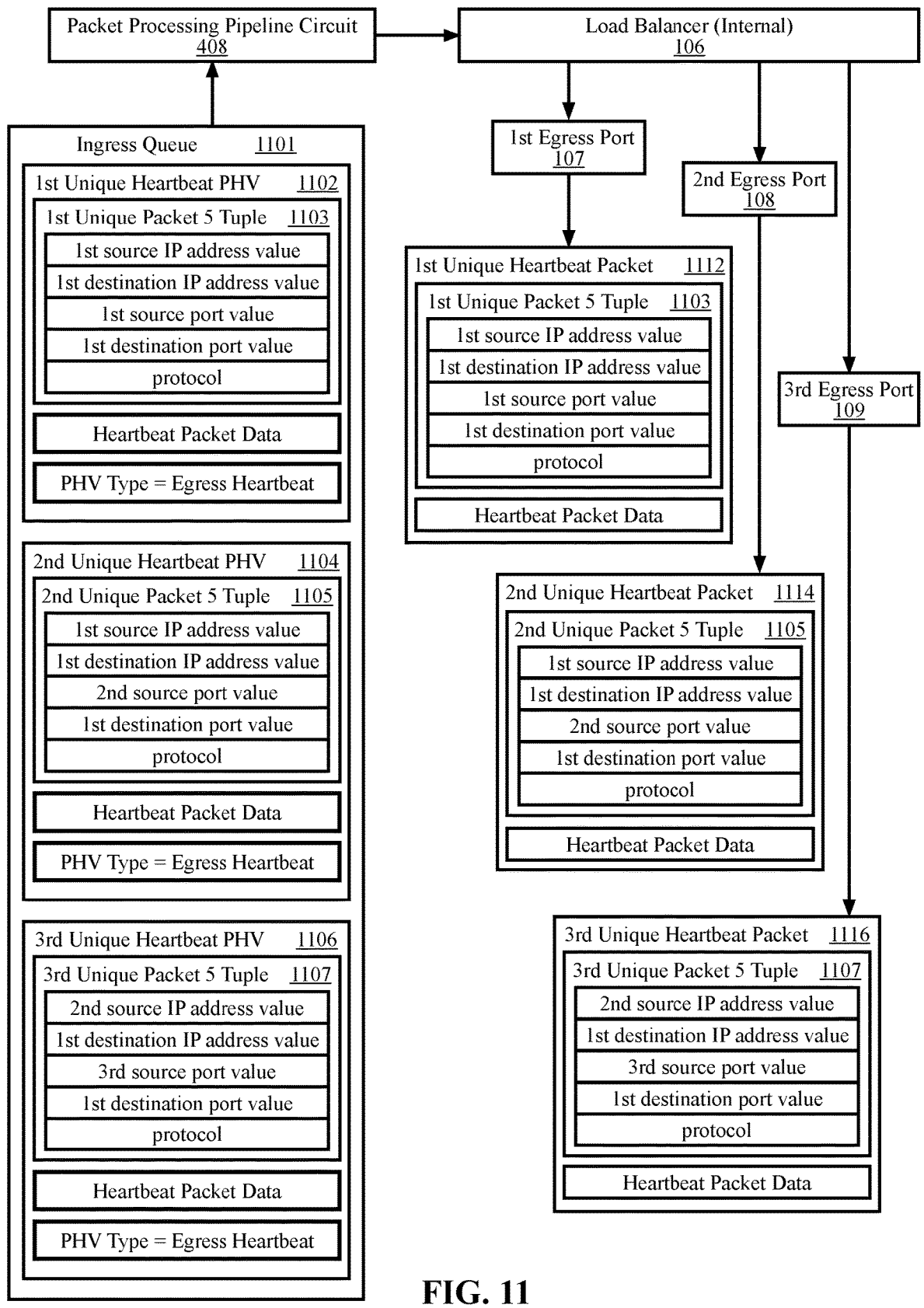
FIG. 11 is a high-level conceptual diagram illustrating a packet processing pipeline producing heartbeat packets, according to some aspects.

FIG. 11 is a high-level conceptual diagram illustrating a packet processing pipeline circuit 408 producing heartbeat packets, according to some aspects. A group or plurality of heartbeat PHVs have been placed on an ingress queue 1101 of the packet processing pipeline circuit 408. The plurality of heartbeat PHVs on the ingress queue 1101 include a first unique heartbeat PHV 1102, a second unique heartbeat PHV 1104, and a third unique heartbeat PHV 1106 are shown on the ingress queue 1101. The packet processing pipeline circuit 408 can process the plurality of heartbeat PHVs to produce a plurality of heartbeat packets that includes a first unique heartbeat packet 1112, a second unique heartbeat packet 1114, and a third unique heartbeat packet 1116. A plurality of heartbeat PHVs are unique heartbeat PHVs when they have a plurality of unique five tuples. The first unique heartbeat PHV 1102 includes the first unique five tuple 1103. The second unique heartbeat PHV 1104 includes the second unique five tuple 1105. The third unique heartbeat PHV 1106 includes the third unique five tuple 1107. A plurality of five tuples is a plurality of unique five tuples when each five tuple is different from each of the other five tuples in the plurality of five tuples. The three unique five tuples 1103, 1105, 1107 are unique because they include different source port values. Furthermore, the third unique five tuple includes a source IP address value that is different from the source IP address value included in the other two five tuples. A plurality of heartbeat PHVs are unique heartbeat PHVs when they have a plurality of unique five tuples. The first unique heartbeat packet 1112 includes the first unique five tuple 1103. The second unique heartbeat packet 1114 includes the second unique five tuple 1105. The third unique heartbeat packet 1116 includes the third unique five tuple 1107. As such, the heartbeat packets shown in FIG. 11 are unique heartbeat packets.

Heartbeat packets that are identical may take the same route from a networking device to a second networking device. Heartbeat packets that have the same source IP address, destination IP address, source port value, and destination port value can be considered to be identical. A heartbeat packet in a first group of heartbeat packets may be identical to a heartbeat packet in a second group of heartbeat packets. The first group of heartbeat packets can be sent during one of the heartbeat periods and the second group of heartbeat packets can be sent during another one of the heartbeat periods.

A load balancer 106 may use the five tuple of a network packet to select an egress port from which to send the network packet toward its destination. The load balancer 106 can receive the heartbeat packets from the packet processing pipeline circuit 408 and may select different egress ports for each. The load balancer 106 sends the first unique heartbeat packet 1112 from the first egress port 107. The load balancer 106 sends the second unique heartbeat packet 1114 from the second egress port 108. The load balancer 106 sends the third unique heartbeat packet 1116 from the third egress port 109.

Figure 12:
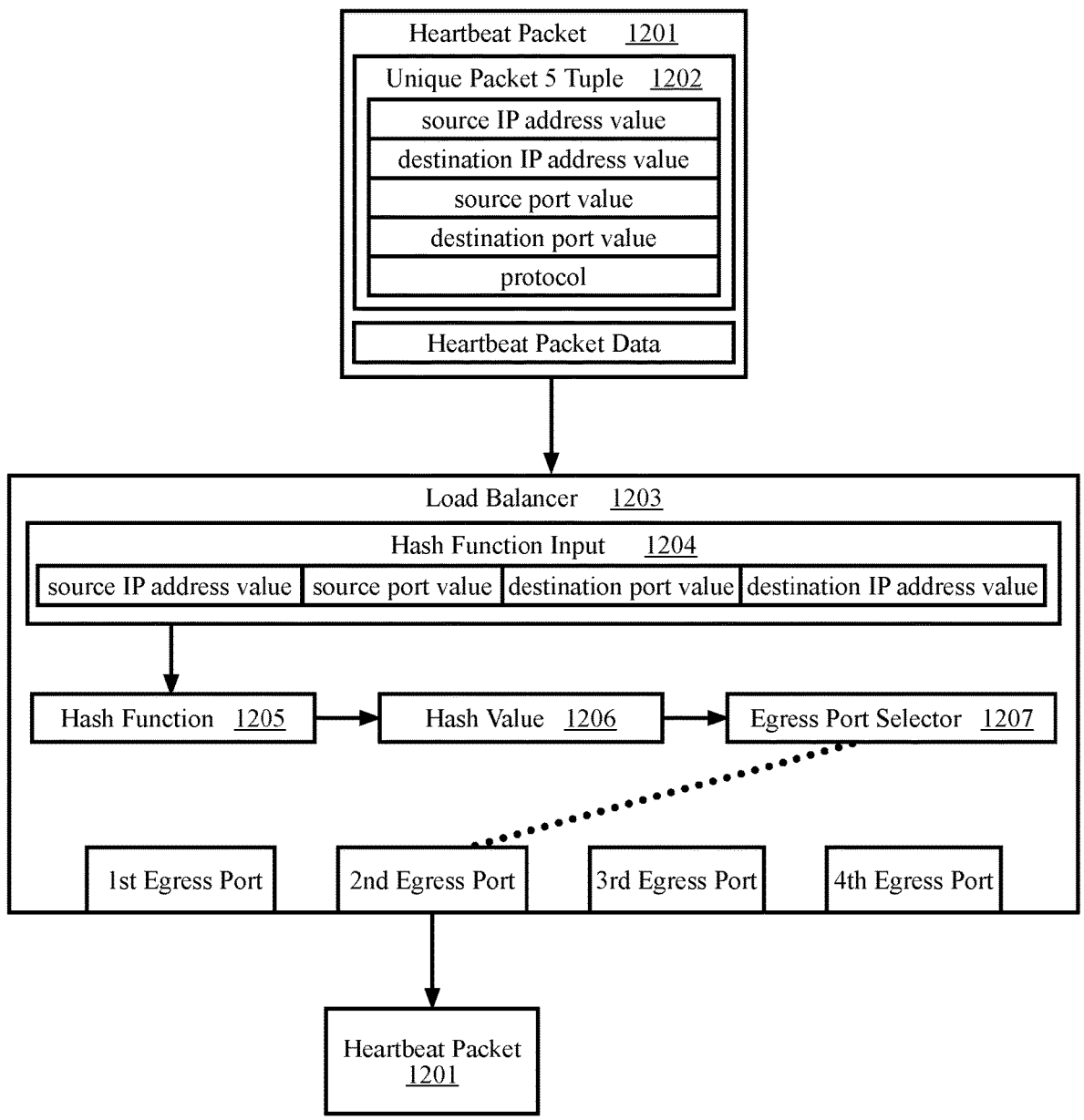
FIG. 12 is a high-level conceptual diagram illustrating a load balancer that uses unique packet five tuples to select egress ports for network packets, according to some aspects.

FIG. 12 is a high-level conceptual diagram illustrating a load balancer 1203 that uses unique packet five tuples to select egress ports for network packets, according to some aspects. The load balancer 1203 receives a heartbeat packet 1201 that includes a unique packet five tuple 1202. The load balancer can concatenate values in the unique packet five tuple 1202 to produce a hash function input 1204. The hash function input 1204 is shown having the source IP address followed by the source port value followed by the destination port value followed by the destination IP address. In this example, only four of the values in the five tuple are used to produce the hash function input. Network packets often have the same few protocol values (e.g., 6 for TCP or 17 for UDP) and the protocol value is therefore not used in this example. As such, the load balancer 1203 is using the packet four tuple (the five tuple without the protocol value) to produce the hash function input 1204. Other examples may include the protocol value in the hash function input 1204. The hash function 1205 produces a hash value 1206 as an output after receiving the hash function input 1204 as an input. Those practiced in the art are aware of many hash functions. For example, CRC calculation circuit 421 may be a hardware implementation of a hash function. A port selector 1207 uses the hash value 1206 to select an egress port. For example, two bits (e.g., the lower two bits) of the hash value can select one of four egress ports. In such an example, 00 can select the first egress port, 01 can select the second egress port, 10 can select the third egress port, and 11 can select the fourth egress port. The example illustrated in FIG. 12 shows the second egress port being selected and the load balancer sending the heartbeat packet 1201 from the second egress port.

Figure 13:
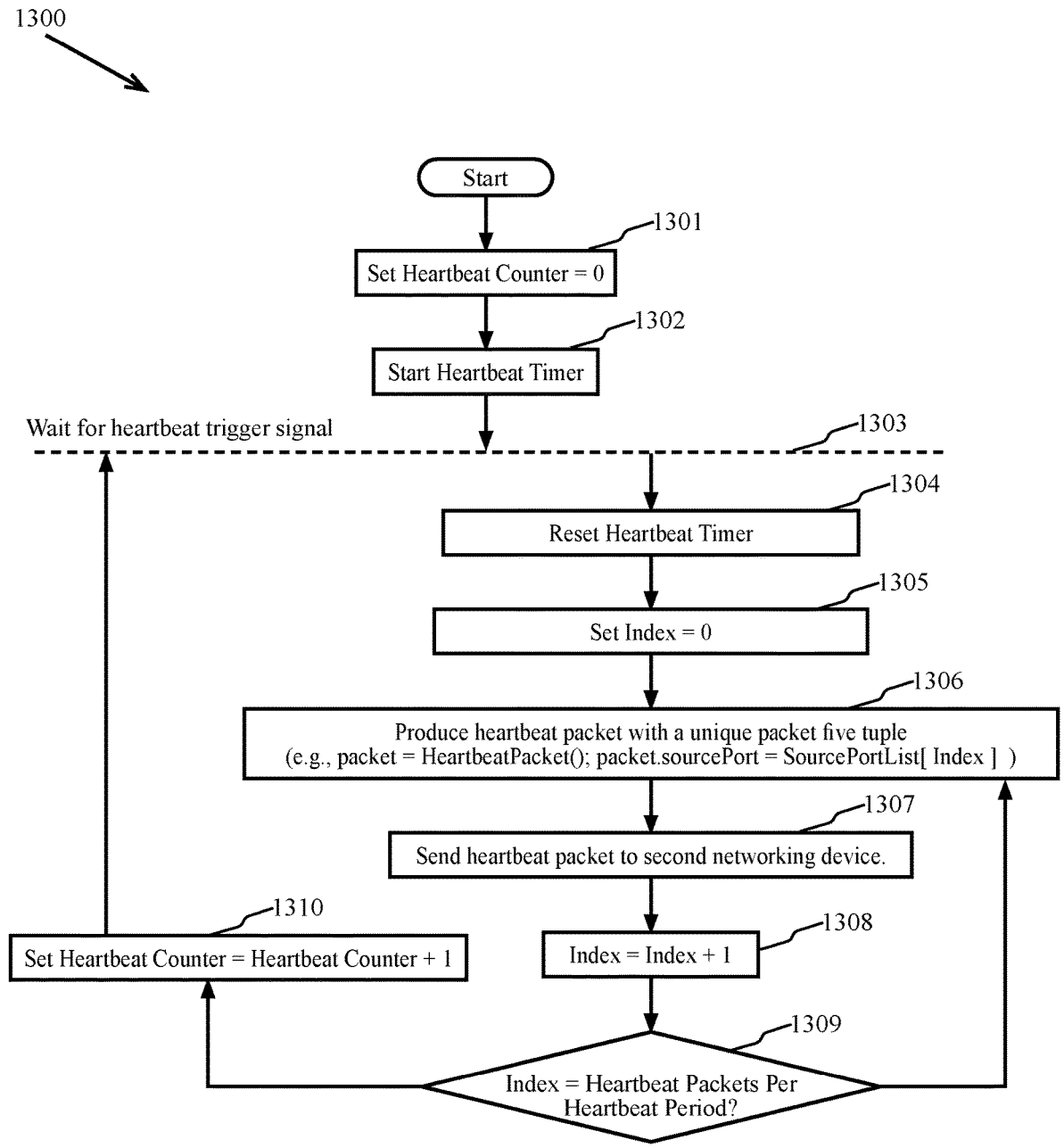
FIG. 13 is a high-level flow diagram illustrating a process that produces and sends a plurality of heartbeat packets every heartbeat period, according to some aspects.

FIG. 13 is a high-level flow diagram illustrating a process that produces and sends a plurality of heartbeat packets every heartbeat period 1300, according to some aspects. The control plane or the data plane may implement the process illustrated in FIG. 13 such that the networking device produces and sends a group of heartbeat packets in response to the heartbeat trigger signal. The control plane may configure the data plane to respond to the heartbeat trigger signal by producing and sending the heartbeat packets. For example, the heartbeat trigger signal may cause a heartbeat trigger PHV to be placed on an ingress queue of the packet processing pipeline circuit. The packet processing pipeline circuit may be configured to respond to a heartbeat trigger PHV by sending a group of heartbeat packets as shown in FIG. 13. After the start, the heartbeat counter is set to zero at block 1301. At block 1302, the heartbeat timer is started. At delay 1303, the process waits for a heartbeat trigger signal that can be produced by the heartbeat timer. The process can continue to block 1304 after receiving the heartbeat trigger signal. At block 1304 the heartbeat timer is reset such that it produces another heartbeat trigger signal at the end of another heartbeat period. At block 1305, index is set to zero. At block 1306, a heartbeat packet with a unique packet five tuple is produced. For example, a constructor (e.g., HeartbeatPacket( )) can produce a generic heartbeat packet and the four tuple can be filled in with values in the heartbeat source port list 445, the heartbeat destination port list 446, the heartbeat source IP list 447, and the heartbeat destination IP list 448. The protocol may be a default value produced by the constructor (e.g., the protocol value for UDP). Setting the packet five tuple to have a unique source port value results in a unique packet five tuple. "Index" can be used to read a unique source port value from the heartbeat source port list. At block 1307 the heartbeat packet is sent to the second networking device. At block 1308, Index is incremented by one. At decision block 1309, the process can determine whether all the heartbeat packets that are to be sent in the current heartbeat period have been sent by checking if Index=Heartbeat Packets Per Heartbeat Period 442. If Index=Heartbeat Packets Per Heartbeat Period 442 at decision block 1309, the process loops back to delay 1303. Otherwise, the process loops back to block 1306.

Figure 14:
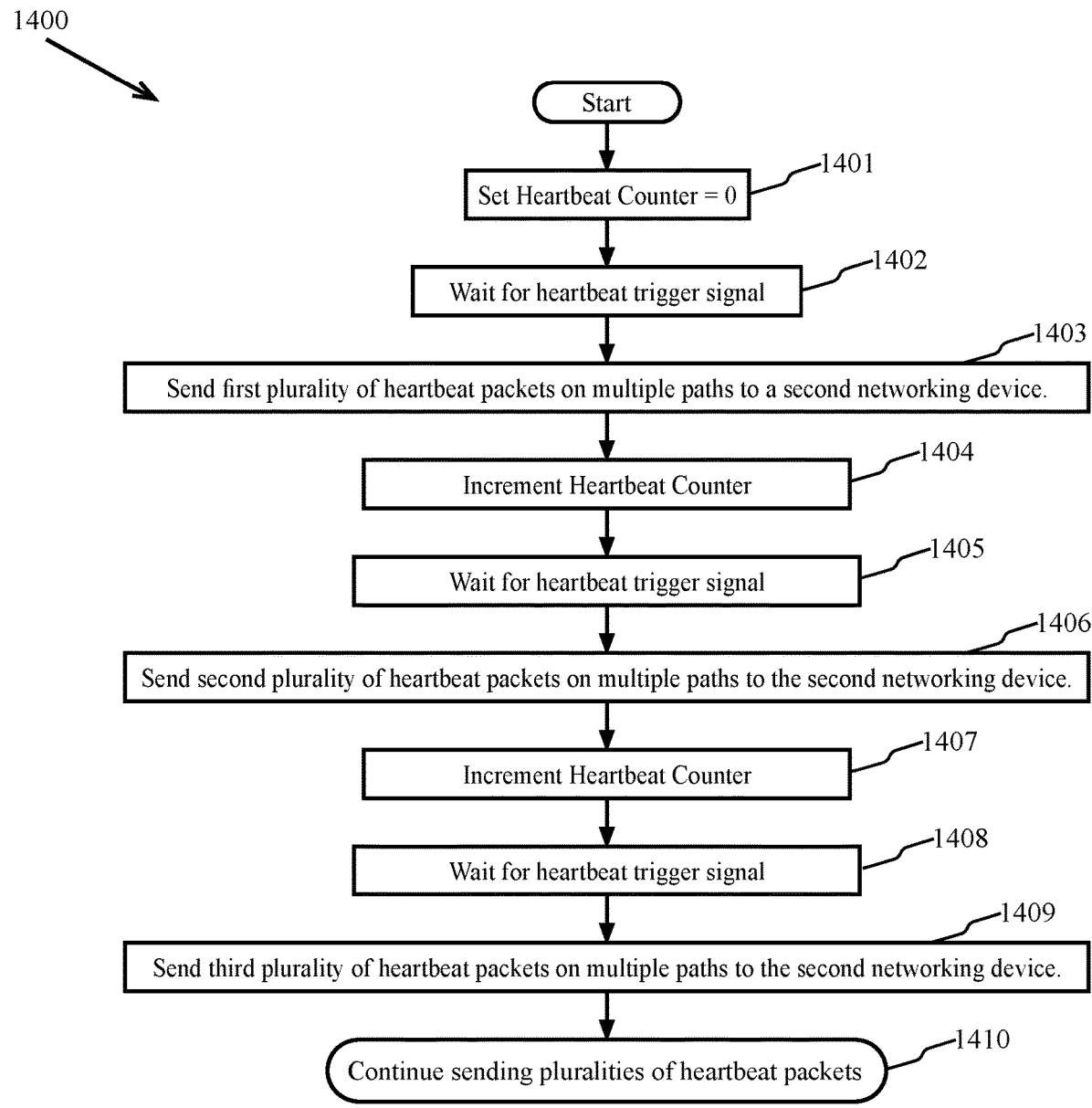
FIG. 14 is a high-level flow diagram illustrating a process that sends pluralities of heartbeat packets on multiple paths to a second networking device, according to some aspects.
Figure 15:
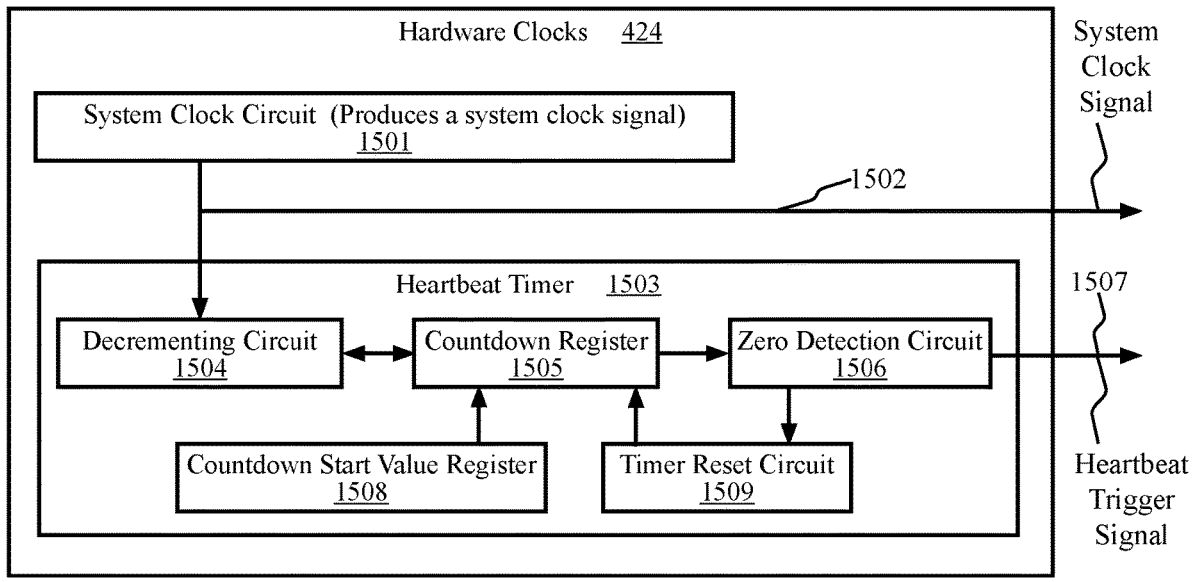
FIG. 15 is a high-level block diagram illustrating a hardware timer used as a heartbeat timer, according to some aspects.

FIG. 14 is a high-level flow diagram illustrating a process that sends pluralities of heartbeat packets on multiple paths to a second networking device 1400, according to some aspects. At block 1401, the heartbeat counter is set to zero. At block 1402, the process waits for a heartbeat trigger signal. At block 1403, the process can send a first plurality of heartbeat packets on multiple paths to a second networking device. This is the first group of heartbeat packets that is sent to the second networking device in response to a signal from the heartbeat timer. At block 1404, the process can increment the heartbeat counter. The heartbeat counter can be a count of the number of times that a group of heartbeat packets has been sent to the second networking device. A group of heartbeat packets can be sent to the second networking device every time there is a heartbeat trigger signal. At block 1405, the process can wait for another heartbeat trigger signal. At block 1406, the process can send a second plurality of heartbeat packets on multiple paths to the second networking device. This is the second group of heartbeat packets that is sent to the second networking device in response to the heartbeat trigger signal. At block 1407, the process can increment the heartbeat counter. At block 1408, the process can wait for yet another heartbeat trigger signal. At block 1409, the process can send a third plurality of heartbeat packets on multiple paths to the second networking device. This is the third group of heartbeat packets that is sent to the second networking device in response to the heartbeat trigger signal. At block 1410, the process can continue sending pluralities of heartbeat packets FIG. 15 is a high-level block diagram illustrating a hardware timer used as a heartbeat timer 1503, according to some aspects. The hardware clocks 424 can include a system clock circuit 1501 and timer circuits such as a heartbeat timer 1503. The system clock circuit can produce a system clock signal 1502. Those familiar with digital systems are familiar with the system clocks, system clock circuits, and system clock signals that are commonly used to clock operations within a semiconductor chip. The system clock can be a sequence of pulses. A pulse can be a transition between two logic levels such as a transition from the voltage level for a logic value of zero to the voltage level for a logic value of one (e.g., edge triggering). The heartbeat timer 1503 can include a countdown register 1505 that is decremented by one upon every pulse of the system clock. The heartbeat timer 1503 can produce a heartbeat trigger signal 1507 when the countdown register 1505 is decre-mented to zero. A pulse in the system clock signal 1502 can trigger a decrementing circuit 1504 to decrement the countdown register 1505 by one. A zero detection circuit 1506 can produce the heartbeat trigger signal 1507 when the countdown register transitions from a value of 1 to a value of zero. The heartbeat timer may have a timer rest circuit 1509 and a countdown start value register 1508. The timer reset circuit may be triggered by the zero detection circuit 1506 to load the value in the countdown start value register 1508 into the countdown register 1505, thereby initiating another timing interval of the heartbeat counter. For example, the system clock signal 1502 may have one trillion pulses per second and a value of ten trillion may be stored in the countdown start value register such that the heartbeat period is ten seconds and there is a heartbeat trigger signal every ten seconds. The heartbeat trigger signal may be a pulse in a sequence of pulses, may be a value stored in a register, or some other trigger. For example, the heartbeat timer may write a value of 1 into a register to thereby indicate that a heartbeat period has elapsed. Such registers are often called doorbells or doorbell registers. A process or circuit that monitors the doorbells may respond to the heartbeat trigger signal by placing a heartbeat trigger PHV on an ingress queue of the packet processing pipeline circuit or by initiating a process such as those shown in FIG. 10 or FIG. 13.

Figure 16:
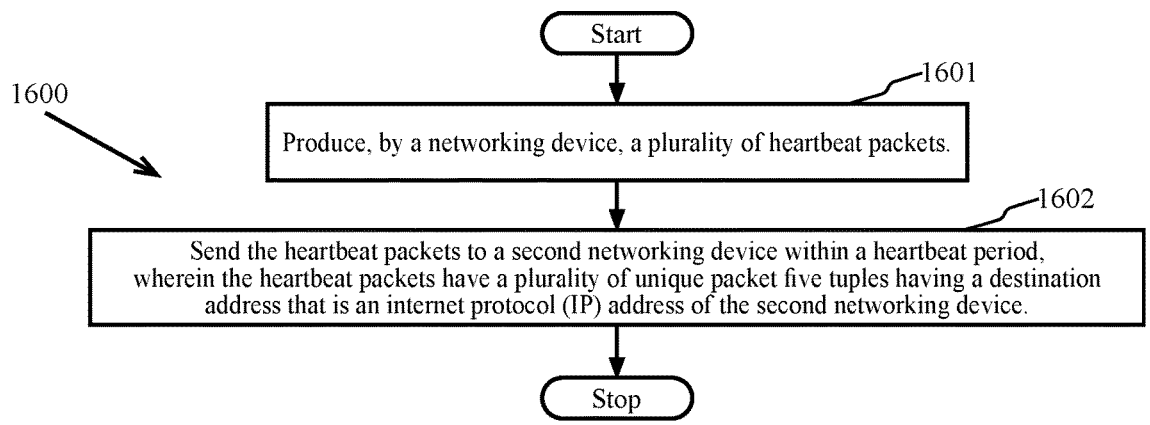
FIG. 16 is a high-level flow diagram illustrating a method for sending a plurality of heartbeat packets on multiple paths to a second networking device, according to some aspects.

FIG. 16 is a high-level flow diagram illustrating a method for sending a plurality of heartbeat packets on multiple paths to a second networking device 1600, according to some aspects. At block 1601, the method can produce, by a networking device, a plurality of heartbeat packets. At block 1602, the method can send the heartbeat packets to a second networking device within a heartbeat period, wherein the heartbeat packets have a plurality of unique packet five tuples having a destination address that is an internet protocol (IP) address of the second networking device.

Aspects described above can be ultimately implemented in a networking device that includes physical circuits that implement digital data processing, storage, and communications. The networking device can include processing circuits, ROM, RAM, TCAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU and other semiconductor chip circuits are fabricated on the same semiconductor substrate to form a System-on-Chip (SoC). The networking device may be implemented as a single IC device (e.g., fabricated on a single substrate) or the networking device may be implemented as a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces such as I2C, general purpose iOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. For example, a computer program product can include a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific examples have been described and illustrated, the scope of the claimed systems, methods, devices, etc. is not to be limited to the specific forms or arrangements of parts so described and illustrated. The scope is to be defined by the claims appended hereto and their equivalents.

What is claimed is:

1. A networking device comprising:
a packet processing pipeline circuit configured to implement a data plane; and
a hardware clock circuit,
wherein the packet processing pipeline circuit and the hardware clock circuit are configured to send a plurality of heartbeat packets on multiple paths to a second networking device, wherein the heartbeat packets are sent within a heartbeat period, and each of the heartbeat packets has a unique packet five tuple that includes an internet protocol (IP) address of the second networking device, and
wherein the networking device is configured to place packet header vectors (PHVs) for the heartbeat packets on an ingress queue of the data plane in response to receiving a heartbeat trigger signal.

2. The networking device of claim 1, wherein the hardware clock circuit is configured to trigger sending the heartbeat packets within the heartbeat period.

3. The networking device of claim 1, wherein:
the hardware clock circuit is configured to produce the heartbeat trigger signal; and
the data plane is configured to send the plurality of heartbeat packets in response to the heartbeat trigger signal.

4. The networking device of claim 1, wherein:
each of the PHVs include the unique packet five tuple for one of the heartbeat packets; and
the heartbeat packets are produced from the PHVs.

5. The networking device of claim 1, wherein:
a first one of the heartbeat packets includes a first source media access controller (MAC) address that is associated with a first egress port of the networking device; and
a second one of the heartbeat packets includes a second MAC address that is associated with a second egress port of the networking device.

6. The networking device of claim 1, wherein:
the unique packet five tuple of each of the heartbeat packets has a source port value that is different from the source port value of every other one of the heartbeat packets; and
every source port value is randomly generated for the unique packet five tuple of each of the heartbeat packets.

7. The networking device of claim 1, wherein the packet processing pipeline circuit is configured to produce a plurality of PHVs for the plurality of heartbeat packets.

8. The networking device of claim 1, further including a control plane configured to place the PHVs on the ingress queue of the data plane in response to the heartbeat trigger signal.

9. The networking device of claim 1, wherein the packet processing pipeline circuit and the hardware clock circuit are configured to produce a second plurality of heartbeat packets and send the heartbeat packets to the second networking device within a second heartbeat period, the second plurality of heartbeat packets having a second plurality of unique packet five tuples.

10. The networking device of claim 9, wherein one of the second plurality of unique packet five tuples and the unique packet five tuple of one of the plurality of heartbeat packets are identical.

11. The networking device of claim 1, further including:
a plurality of egress ports,
wherein:
the networking device is configured to assign at least on MAC address to the plurality of egress ports;
the data plane is configured to implement a load balancer;
the load balancer uses the unique packet five tuple of a first one of the heartbeat packets to select a first one of the egress ports; and
the load balancer uses the unique packet five tuple of a second one of the heartbeat packets to select a second one of the egress ports.

12. The networking device of claim 1, wherein:
the networking device is configured to send the heartbeat packets to a load balancer that sends the heartbeat packets from a plurality of egress ports; and
the load balancer is configured to use the unique packet five tuple of each of the heartbeat packets to select the egress ports for the heartbeat packets.

13. A method comprising:
producing, by a hardware clock circuit of a networking device, a heartbeat trigger signal;
responding, by the networking device, to the heartbeat trigger signal by queueing a plurality of packet header vectors (PHVs) for a plurality of heartbeat packets on an ingress queue of a data plane of the networking device;
sending, by the data plane, the heartbeat packets, the heartbeat packets sent in response to the PHVs queued on the ingress queue; and
wherein each of the heartbeat packets has a unique packet five tuple having a destination address that is an internet protocol (IP) address of a second networking device.

14. The method of claim 13, wherein:
the networking device includes a packet processing pipeline circuit configured to implement the data plane;
the networking device includes a processor configured to implement a control plane that configures the data plane to send the heartbeat packets to the second networking device; and
the control plane configures the hardware clock circuit to implement a heartbeat timer that produces the heartbeat trigger signal.

15. The method of claim 13, wherein the heartbeat packets are sent within a heartbeat period.

16. The method of claim 13, wherein:
the heartbeat trigger signal triggers sending a second plurality of heartbeat packets to the second networking device.

17. The method of claim 13, wherein the unique packet five tuple of each of the heartbeat packets include a plurality of unique source port values.

18. The method of claim 13, wherein:
a first one of the heartbeat packets includes a first source media access controller (MAC) address that is associated with a first egress port of the networking device; and
a second one of the heartbeat packets includes a second MAC address that is associated with a second egress port of the networking device.

19. A networking device comprising:
a clock circuit means for producing a heartbeat trigger signal;
a PHV queuing means for responding to the heartbeat trigger signal by queuing a plurality of packet header vector (PHVs) on an input queue, the PHVs having a plurality of unique packet five tuples having a destination address that is an internet protocol (IP) address of a second networking device;
a sending means for sending a plurality of heartbeat packets on multiple paths to the second networking device in response to the PHVs queued on the input queue; and
a pipeline circuit means for implementing the sending means.

20. The networking device of claim 19, further including:
a first egress means for sending a first one of the heartbeat packets to the second networking device;
a second egress means for sending a second one of the heartbeat packets to the second networking device; and
a load balancer means for selecting the first egress means to send the first one of the heartbeat packets.

* * * * *